(12) United States Patent
Takase et al.

(10) Patent No.: US 8,320,238 B2
(45) Date of Patent: Nov. 27, 2012

(54) COMMUNICATION DEVICE WITH A PATH PROTECTION FUNCTION, AND NETWORK SYSTEM USING THE COMMUNICATION DEVICE

(75) Inventors: Masayuki Takase, Fujisawa (JP); Hideki Endo, Kawasaki (JP); Taisuke Ueta, Kokubunji (JP); Takayuki Kanno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 761 days.

(21) Appl. No.: 12/479,201

(22) Filed: Jun. 5, 2009

(65) Prior Publication Data

US 2009/0303996 A1    Dec. 10, 2009

(30) Foreign Application Priority Data

Jun. 9, 2008   (JP) ................................. 2008-150281

(51) Int. Cl.
*H04L 1/00* (2006.01)
*H04L 12/26* (2006.01)
*H04L 12/28* (2006.01)
*H04L 12/56* (2006.01)

(52) U.S. Cl. ........................................ 370/228; 370/390
(58) Field of Classification Search .......................... None
See application file for complete search history.

(56) References Cited

U.S. PATENT DOCUMENTS

| | | | |
|---|---|---|---|
| 7,804,767 B1 * | 9/2010 | Owens et al. ................ | 370/217 |
| 2007/0201355 A1 | 8/2007 | Vasseur et al. | |
| 2007/0268899 A1 * | 11/2007 | Cankaya ...................... | 370/390 |
| 2008/0095161 A1 * | 4/2008 | Xu ................................ | 370/390 |
| 2008/0107018 A1 * | 5/2008 | Zhang et al. .................. | 370/228 |
| 2008/0123524 A1 | 5/2008 | Vasseur et al. | |
| 2009/0034413 A1 * | 2/2009 | Sajassi et al. ................ | 370/228 |
| 2009/0185478 A1 * | 7/2009 | Zhang ........................... | 370/216 |
| 2009/0245248 A1 * | 10/2009 | Arberg et al. ................ | 370/390 |
| 2010/0091648 A1 * | 4/2010 | Zhao ............................. | 370/225 |
| 2010/0226244 A1 | 9/2010 | Mizutani et al. | |

FOREIGN PATENT DOCUMENTS

| | | |
|---|---|---|
| JP | 2000-36818 A | 2/2000 |
| JP | 2004-80532 A | 3/2004 |
| JP | 2007-282153 A | 10/2007 |
| WO | 2007/086157 A1 | 8/2007 |

OTHER PUBLICATIONS

A. Fei et al., A "Dual-Tree" Scheme for Fault-Tolerant Multicast, IEEE, Jun. 11, 2001, pp. 690-694, vol. 3, Computer Science Department, University of California, Los Angeles, CA.

(Continued)

*Primary Examiner* — Chirag Shah
*Assistant Examiner* — Suk Jin Kang
(74) *Attorney, Agent, or Firm* — Mattingly & Malur, PC

(57) ABSTRACT

Provided is a network system including a start device and multiple end devices. A point-to-point (P-to-P) logical path is set to be used for unicast communication between the start device and each of the end devices. A first point-to-multipoint (P-to-M) logical path and a second P-to-M logical path are set to be used for multicast communication from the start device to the multiple end devices. The start device transmits data over the first P-to-M logical path. When one of the end devices detects a defect along the first P-to-M logical path, the end device that has detected the defect transmits a switch request over the P-to-P logical path set between this end device and the start device. The start device receives the switch request and transmits data over the second P-to-M logical path.

19 Claims, 20 Drawing Sheets

OTHER PUBLICATIONS

H. Long et al., A Mechanism for Restorable QoS Routing, IEEE, Oct. 20, 2003, pp. 61-67. The Research Center of Network Technologies, NanJing University of Posts and Telecommunications, NanJing, China.

B. Rajagopalan et al., IP over Optical Networks: Architectural Aspects, IEEE Communications Magazine, Sep. 2000, pp. 94-102, vol. 38, No. 9, Piscataway, USA.

* cited by examiner

LOGICAL PATH ID MANAGEMENT DATABASE 140

| MPLS LABEL VALUE | LOGICAL PATH TYPE | LOGICAL PATH ID | LOGICAL PATH STATUS |
|---|---|---|---|
| 200 | P-to-P | 20 | 0 |
| 300 | P-to-P | 20 | 1 |
| 2000 | P-to-M | 40 | 0 |
| 3000 | P-to-M | 40 | 1 |
|  |  |  |  |
|  |  |  |  |

*FIG. 7*

P-to-P LOGICAL PATH MANAGEMENT DATABASE 130-1

| P-to-P LOGICAL PATH ID | P-to-P_ACT PATH | ALERT INFORMATION | P-to-M SETTING INDICATOR | PAIRED P-to-M LOGICAL PATH ID |
|---|---|---|---|---|
| 20 | 0 | NO ALERT INFORMATION | ENABLED | 40 |
| 60 | 1 | NO ALERT INFORMATION | ENABLED | 50 |
|  |  |  |  |  |
|  |  |  |  |  |

*FIG. 8*

P-to-M LOGICAL PATH MANAGEMENT DATABASE   130-2

| P-to-M LOGICAL PATH ID (136) | P-to-M_ACT PATH (137) | ALERT INFORMATION (138) | PAIRED P-to-P LOGICAL PATH ID (139) |
|---|---|---|---|
| 40 | 0 | NO ALERT INFORMATION | 20 |
| 50 | 1 | NO ALERT INFORMATION | 60 |
|  |  |  |  |
|  |  |  |  |

*FIG. 9*

MPLS LABEL MANAGEMENT DATABASE 120

| LOGICAL PATH ID (121) | ACT PATH (122) | PRIMARY (0) MPLS LABEL VALUE (123) | SECONDARY (1) MPLS LABEL VALUE (124) |
|---|---|---|---|
| 20 | 0 | 200 | 300 |
| 40 | 0 | 2000 | 3000 |
| 50 | 1 | 1000 | 1500 |
| 60 | 1 | 5000 | 7000 |

FIG. 10

COMMUNICATION DEVICE WITH A PATH PROTECTION FUNCTION, AND NETWORK SYSTEM USING THE COMMUNICATION DEVICE

CLAIM OF PRIORITY

The present application claims priority from Japanese patent application JP 2008-150281 filed on Jun. 9, 2008, the content of which is hereby incorporated by reference into this application.

BACKGROUND OF THE INVENTION

This invention relates to a communication device. More particularly, a technology disclosed herein relates to a method of notifying a defect along a point-to-multipoint logical path in multiprotocol label switching (MPLS) and other transfer protocols where a connection-oriented logical path is built, to a logical path switching method, and to a communication device that has a logical path defect notifying function and a logical path switching function.

With the progress of IT and the broadening of the bandwidth of wide area networks (WANs) or metropolitan area networks (MANs), multimedia contents that are characterized by data distribution through streaming are increasing mainly among corporations as observed in, for example, a high-definition system for video conferencing involving multiple sites and live in-house broadcasting. Such streaming data are characterized by being distributed one-way through point-to-multipoint communication (i.e., from a start node which distributes the data to multiple end nodes which receive the data), and by their need for a regular, stable transmission path bandwidth for the distribution. Since those applications require real-timeness, communication breakdown due to a defect along the transmission path can lead to a huge loss in a user's benefit and is unacceptable. Network providers that provide the WAN/MAN service therefore need to provide a measure of detecting a defect in a point-to-multipoint path, and path protection.

Conventional technologies for protecting a connection-oriented point-to-multipoint path are described in JP 2000-36818 A and JP 2007-282153 A.

JP 2000-36818 A makes a suggestion about recovery from a defect in a point-to-multipoint path in a tree topology network. Specifically, the publication proposes recovery from a defect, in which a route that bypasses a detected defect between relay nodes is calculated based on adjacent node information that the devices hold, and the defect bypassing path is set.

JP 2007-282153 A makes a suggestion about recovery of a point-to-multipoint path in a ring topology network. Specifically, the proposed recovery from a defect utilizes the ring feature of the network topology to build a logical path such that end nodes of a point-to-multipoint path include the start node of the point-to-multipoint path. A normal communication point-to-multipoint path and an auxiliary communication point-to-multipoint path are also prepared. In the event of a defect, a node that has detected the defect notifies each end node of defect information via the point-to-multipoint path used for communication. Since the end nodes include the start node of the point-to-multipoint path, the defect information reaches the start node as well. Detecting the defect information, the start node switches from the normal communication point-to-multipoint path to the auxiliary communication point-to-multipoint path, and thus accomplishes a recovery from the defect.

SUMMARY OF THE INVENTION

In JP 2000-36818 A, every node that constitutes the network is required to have the function of calculating a defect bypassing route in order to implement the protection of a point-to-multipoint path. In addition, a point-to-multipoint path between adjacent nodes is divided into sections which are managed separately by the respective nodes, and nodes autonomously determine a defect bypassing path on their own. This gives rise to such problems as a difficulty in finding out which node a path set to bypass a defect runs through, and the uncertainty about whether or not the defect bypassing route can keep a bandwidth that has been secured by the pre-defect route. A network of this type does not allow the network administrator's intention to be reflected on the network design. Further, the need for every node that constitutes the network to have a defect bypassing function makes the nodes expensive.

A problem of the technology disclosed in JP 2007-282153 A is that it is a protection function limited to networks that have a ring topology and cannot be applied to tree topology networks where the start node and the end node are different nodes. The technology of JP 2007-282153 A is not always applicable to WANs interconnecting companies whose network topologies are often of the tree type.

A first object of this invention is to provide a network system and a communication device that are capable of switching from a normal communication point-to-multipoint path to an auxiliary communication point-to-multipoint path between a start node and an end node in the event of a defect in the normal point-to-multipoint path, irrespective of what network topology is employed.

A second object of this invention is to provide a network system and a communication device that, after a switch to an auxiliary communication path, keep a communication bandwidth equivalent to one used prior to the occurrence of a defect.

A third object of this invention is to provide a network system and a communication device that enable a network administrator to identify a defect point in the network.

According to a representative invention disclosed in this application, there is provided a network system comprising multiple communication devices, the multiple communication devices comprising one start device, multiple end devices, and multiple relay devices for relaying data communication between the start device and the multiple end devices, in which a point-to-point logical path is set to be used for unicast communication between the start device and each of the multiple end devices, and in which two point-to-multipoint logical paths are set to be used for multicast communication from the start node to the multiple end nodes, wherein the two point-to-multipoint logical paths comprise a first point-to-multipoint logical path, which passes through at least one of the multiple relay nodes, and a second point-to-multipoint logical path, which passes through at least one of the multiple relay nodes different from the at least one of the multiple relay nodes along the first point-to-multipoint logical path, wherein the start device transmits, over the first point-to-multipoint logical path, data to be transmitted to the multiple end devices, wherein, when one of the multiple end devices detects a defect on the first point-to-multipoint logical path, the one of the multiple end devices that has detected the defect transmits management information containing a logical path switch request over the point-to-point logical path set between the one of the multiple end devices and the start device, and wherein the start device receives the logical path switch request over the point-to-point logical path, and subsequently transmits, over the second point-to-multipoint logical path, the data to be transmitted to the multiple end devices.

According to an aspect of this invention, two different point-to-multipoint paths are built so that, in the event of a defect, an end node that has detected the defect transmits a path switch request for a switch from the normal communication path to the auxiliary communication path to a start node via a point-to-point path. This makes it possible to notify the start node of defect information about a defect in a point-to-multipoint path, which is basically for one-way communication. A network system that switches a path used for communication only between a start node and end nodes from a normal communication path to an auxiliary communication path is thus provided.

In the case where a network administrator sets before the start of a service a normal communication path and an auxiliary communication path such that a given communication bandwidth is secured for the paths, the communication quality can be kept to a level equivalent to the one prior to the occurrence of a defect despite the switching of paths necessitated by the defect.

Further, at which point along a point-to-multipoint path a defect has occurred can be identified by transmitting defect information from an end node of the point-to-multipoint path via a point-to-point path.

BRIEF DESCRIPTION OF THE DRAWINGS

FIG. 7 is an explanatory diagram illustrating an example of a logical path ID management DB according to the embodiment of this invention.

FIG. 8 is an explanatory diagram illustrating an example of a P-to-P logical path management database according to the embodiment of this invention.

FIG. 9 is an explanatory diagram illustrating an example of a P-to-M logical path management database according to the embodiment of this invention.

FIG. 10 is an explanatory diagram illustrating an example of an MPLS label management database according to the embodiment of this invention.

DETAILED DESCRIPTION OF THE PREFERRED EMBODIMENT

A detailed description is given below with reference to the accompanying drawings on a preferred embodiment of a network according to this invention, a communication device that constitutes the network, and protection, defect detection, and defect notification in a point-to-multipoint path. The following embodiment describes this invention taking a multiprotocol label switching (MPLS) protocol as an example. However, this invention is applicable to any protocol that builds a connection-oriented logical path to transfer frames.

Figure 1:
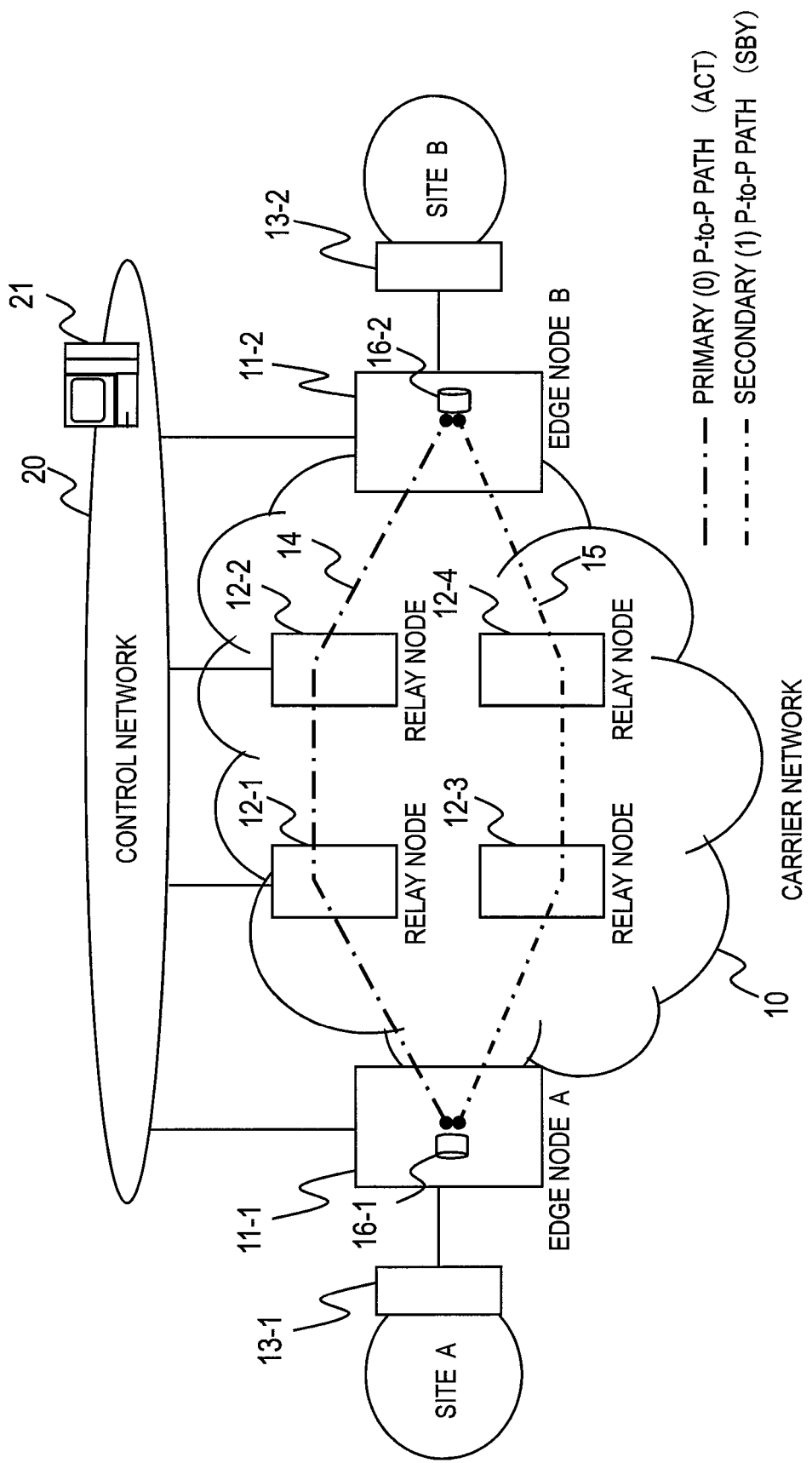
FIG. 1 is an explanatory diagram illustrating an example of a carrier network according to an embodiment of this invention.

FIG. 1 is an explanatory diagram illustrating an example of a carrier network 10 according to an embodiment of this invention.

Specifically, FIG. 1 illustrates an example of the carrier network 10 in which a point-to-point logical path is set between an edge node A 11-1, which accommodates a user site A (hereinafter referred to as site A), and an edge node B 11-2, which accommodates a user site B (hereinafter referred to as site B).

The carrier network 10 includes edge nodes 11 (in the example of FIG. 1, the edge node A 11-1 and the edge node B 11-2), which are for accommodating user sites or the like by the carrier network, and relay nodes 12 (in the example of FIG. 1, relay nodes 12-1 to 12-4), which transfer received data to its data destination. The communication nodes that constitute the carrier network 10 (i.e., the edge nodes 11 and the relay nodes 12) are connected to a control network 20, which sets path information.

The carrier network 10 accommodates the site A and the site B by connecting the site A to the edge node A 11-1 of the carrier network 10 via a user edge node 13-1 and connecting the site B to the edge node B 11-2 of the carrier network 10 via a user edge node 13-2. User edge nodes 13 (the user edge node 13-1 and the user edge node 13-2) execute shaping processing of data that is transmitted from their sites to the carrier network, frame processing for identifying data within their own sites, and other processing.

The carrier network 10 sets a connection-oriented logical path with the edge node A 11-1 and the edge node B 11-2 as the start point and the end point, respectively, in order to secure a communication route between the site A and the site B. In the case where the carrier network 10 is to have logical path redundancy, two logical paths, namely, a primary (0) point-to-point (hereinafter abbreviated as P-to-P) path 14 and a secondary (1) P-to-P path 15, are set between the edge node A 11-1 and the edge node B 11-2.

With two logical paths set, one is used as a normal communication path which is for user data communication, and the other is used as an auxiliary path which is put into use in the event of a defect in the normal communication path. The auxiliary path is not used for data transfer until the defect occurs. In this embodiment, a logical path that is being used for user data communication (a logical path that is in operation, or active) is referred to as an ACT logical path and a logical path that is not being used for user data communication (a standby logical path) is referred to as an SBY logical path.

An example of how a logical path between edge nodes is set is described. A network administrator operates a network management system 21 to set a logical path and a communication bandwidth to each communication node over the control network 20. Depending on what network management method is employed, the network administrator may specify only edge nodes to be connected by a logical path and a communication bandwidth, leaving the network management system 21 to calculate automatically which relay node a logical path runs through and to set an optimum path in the respective relay nodes.

The control network and the network management system are omitted from FIGS. 4, 5, and 11, which are described later.

In this manner, a logical path for which a communication bandwidth and route are secured is set between edge nodes within the carrier network. The edge nodes add an MPLS label, which serves as an identifier for identifying the logical path, to communication data exchanged between user sites, and then transfer the communication data to a relay node.

The edge nodes also check the connectivity and notify defect information by utilizing an MPLS operation administration and maintenance (OAM) function. The edge nodes may have an additional function of switching a path used for communication by transmitting and receiving a path switch request and a path switch response between the edge nodes.

Figure 2:
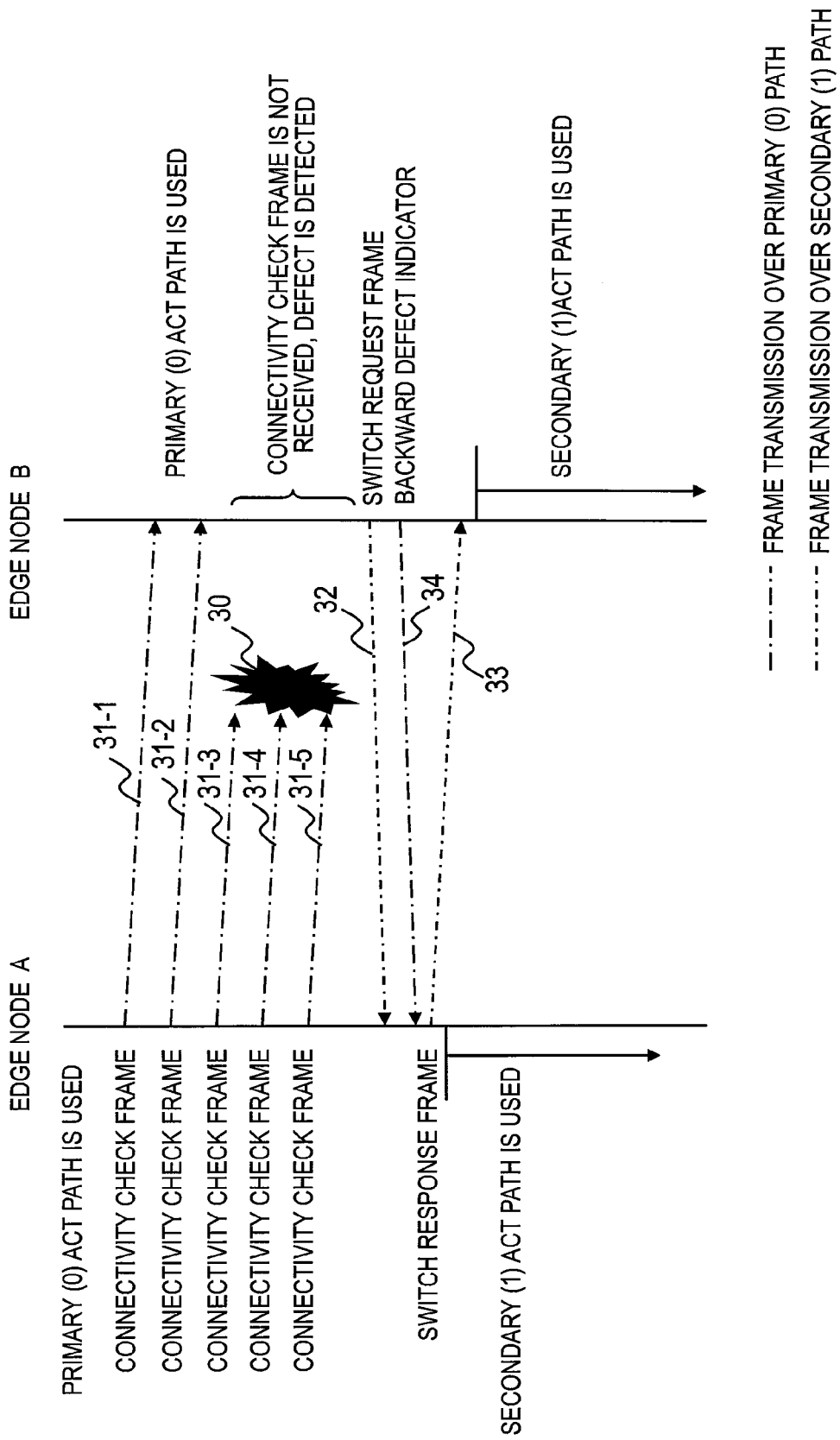
FIG. 2 is a sequence diagram illustrating defect detection and path switching in P-to-P paths according to the embodiment of this invention, in which a connectivity check frame is used.

FIG. 2 is a sequence diagram illustrating defect detection and path switching in P-to-P paths according to the embodiment of this invention, in which a connectivity check frame is used.

In FIG. 2, connectivity check frames 31-1 to 31-5 are transmitted on a given schedule (regularly, for example) in a primary (0) path that runs from an edge node A (e.g., the edge node A 11-1 illustrated in FIG. 1) to an edge node B (e.g., the edge node B 11-2 illustrated in FIG. 1). Similarly, though not illustrated in FIG. 2, connectivity check frames are transmitted in a secondary (1) path that runs from the edge node A to the edge node B and in primary (0) and secondary (1) paths that run from the edge node B to the edge node A.

The connectivity of a logical path (in other words, whether communication over the logical path is possible or not) can be checked by regularly terminating a connectivity check frame in an end node of a logical path.

A defect 30 of some kind in a communication route along which a logical path runs prevents the edge node B from regularly receiving a connectivity check frame. The edge node B thus detects that a defect has occurred in the logical path.

Upon detecting a defect, the edge node B transmits a backward defect indicator 34. The reception of the backward defect indicator 34 is confirmation for the edge node A that a defect has occurred in a logical path that runs from the edge node A to the edge node B.

In the case where the logical path is duplicated as in the example of FIG. 1, the edge node B detecting a defect transmits a switch request frame 32 to the edge node A, to thereby request a switch between paths. This logical path switching processing is called automatic protection switching (APS).

Receiving the switch request frame 32, the edge node A switches the ACT logical path from the primary (0) path where the defect has occurred to the secondary (1) path which is not experiencing a defect. The edge node A subsequently transmits a switch response frame 33 to the edge node B. The edge node B receives the switch response frame 33 and switches the ACT logical path from the primary (0) path to the secondary (1) path.

In this way, switching paths such that the path where a defect has occurred is used as a stand-by communication path (SBY path) whereas the path that is not experiencing a defect is used as an active communication path (ACT path) ensures that a logical path is provided to continue communication after a defect has occurred. Moreover, because a desired communication bandwidth has been secured for the primary (0) path and the secondary (1) path each when the logical paths have been set, a communication bandwidth provided for communication between the user site A and the user site B after the switch is equivalent to the one prior to the switch.

Figure 3:
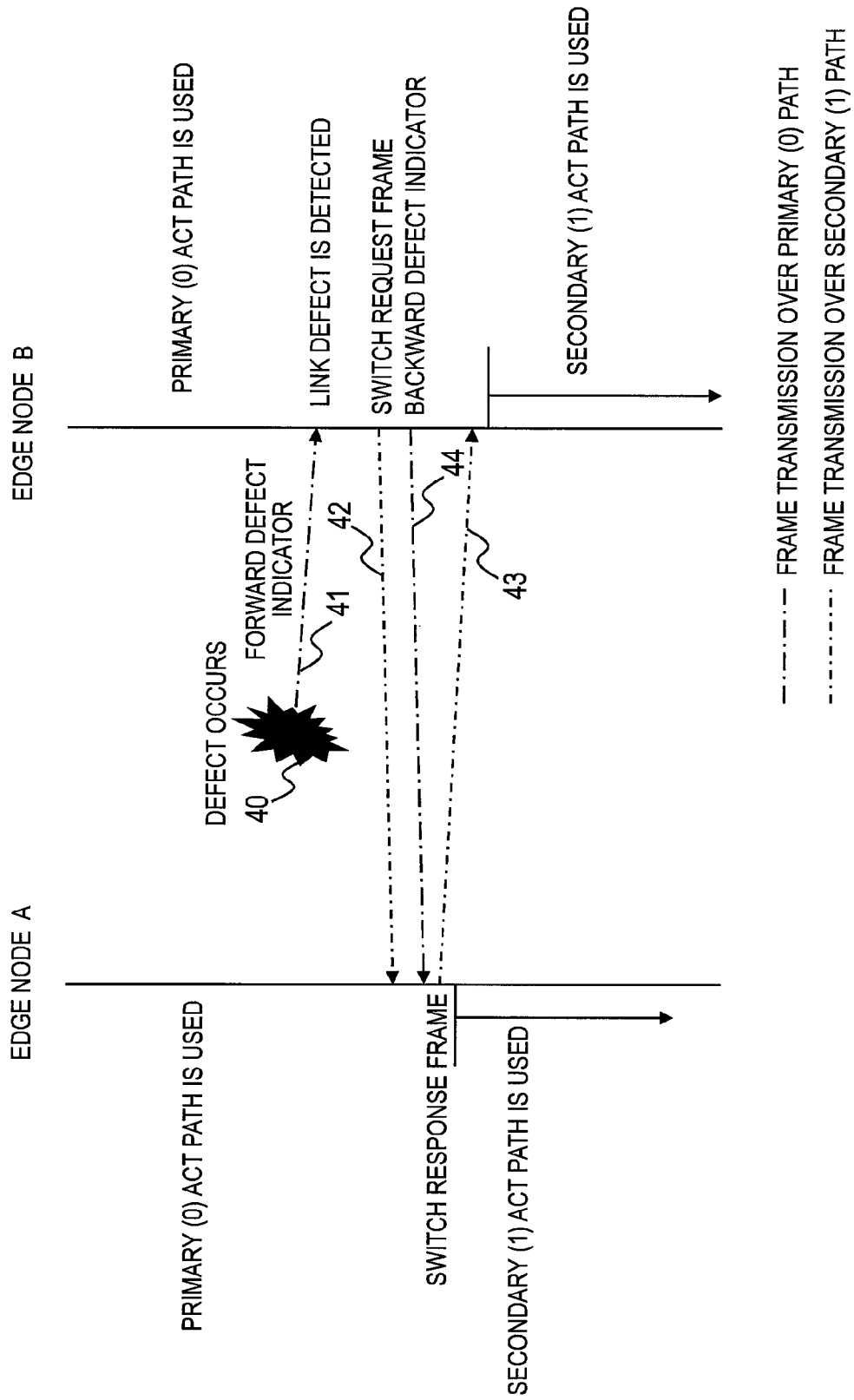
FIG. 3 is a sequence diagram illustrating defect detection and path switching in P-to-P paths according to the embodiment of this invention, in which a connectivity check frame is not used.

FIG. 3 is a sequence diagram illustrating defect detection and path switching in P-to-P paths according to the embodiment of this invention, in which a connectivity check frame is not used.

Defect detection illustrated in FIG. 3 is effective in cases where relay nodes have a function of transmitting, upon detection of a defect, a forward defect indicator to an end node of a logical path relevant to the defect.

When a defect 40 occurs in the example of FIG. 3, a relay node (not shown) detects the defect and transmits a forward defect indicator 41 to a logical path that is affected by the defect. The edge node B receives the forward defect indicator 41 and thereby detects that a defect has occurred. A processing operation performed between the edge node A and the edge node B after the detection of a defect, specifically, the transmission and reception of a backward defect indicator 44, the transmission and reception of a switch request frame 42, and the transmission and reception of a switch response frame 43 are the same as the transmission and reception of the backward defect indicator 34, the transmission and reception of the switch request frame 32, and the transmission and reception of the switch response frame 33 which are illustrated in FIG. 2. A description of the processing operation is therefore omitted here.

The above-mentioned OAM function and APS function enable the carrier network to continue communication after a defect has occurred through duplicated P-to-P paths and to identify the point of the defect.

In a carrier network as this, a network system builds a point-to-multipoint (hereinafter abbreviated as P-to-M) path having one edge node as the start node and multiple edge nodes as end nodes, duplicates the P-to-M path, and secures a communication bandwidth for the P-to-M paths. The network system is described with reference to FIGS. 4 to 18.

P-to-M path protection is accomplished by setting P-to-P paths that enable the start node and the respective end nodes to have two-way communication with each other. Those P-to-P paths are used as unicast communication paths between sites.

Figure 4:
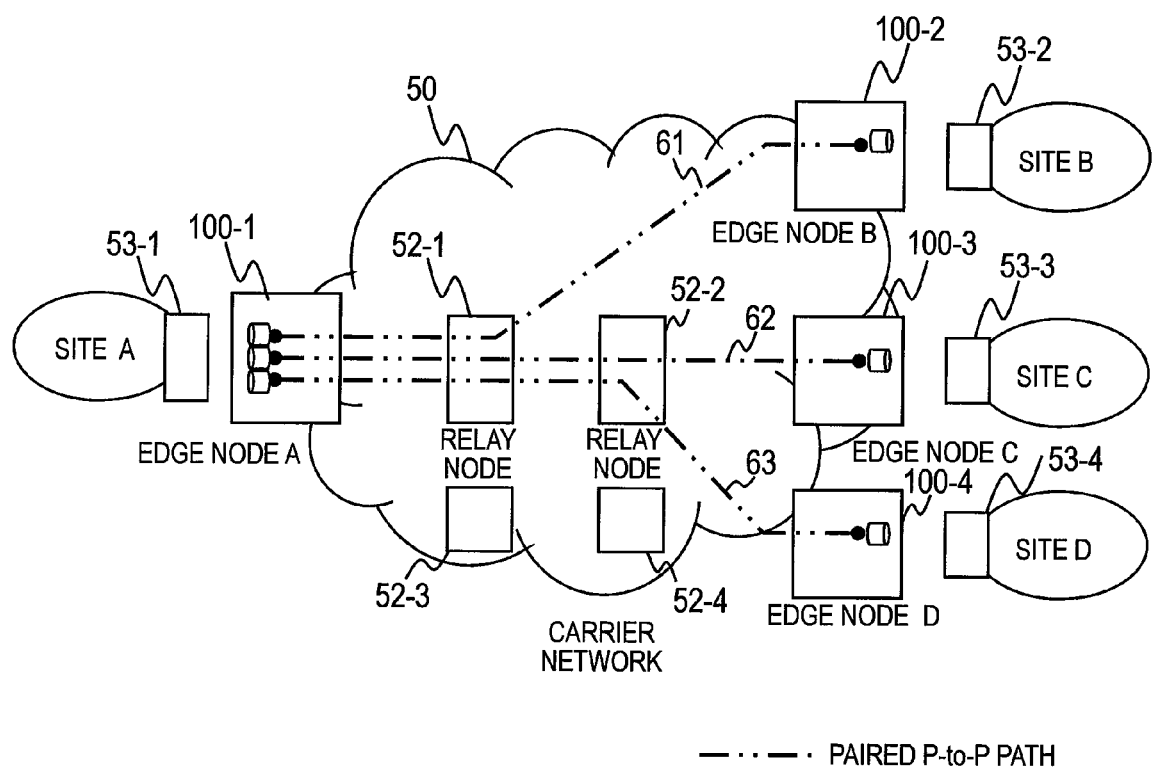
FIG. 4 is an explanatory diagram illustrating an example of P-to-P paths set in a carrier network according to the embodiment of this invention.

FIG. 4 is an explanatory diagram illustrating an example of P-to-P paths set in a carrier network 50 according to the embodiment of this invention.

Specifically, FIG. 4 is a diagram illustrating an example in which P-to-P logical paths are set between a site A and a site B, between a site A and a site C, and between a site A and a site D.

A logical path 61 passing through a relay node 52-1 is set to run from an edge node A 100-1, which accommodates a site A 53-1, to an edge node B 100-2, which accommodates a site B 53-2.

Only the logical path 61 passing through the relay node 52-1 is illustrated in FIG. 4 as the representative path between the edge node A 100-1 and the edge node B 100-2. Actually, another logical path (not shown) which passes through a different relay node is set between the edge node A 100-1 and the edge node B 100-2 so that logical path duplication is implemented by those two paths. Logical paths duplicated in this manner are referred to as paired P-to-P paths. In FIG. 4, one of the two P-to-P paths in any paired P-to-P paths is indicated by a long dash and two dots line, whereas the other is omitted from the drawing. The term "representative path" used in the description of FIG. 4 means a P-to-P path that is illustrated in FIG. 4, as opposed to the P-to-P path omitted from FIG. 4. In the event of a defect, communication is continued by executing automatic logical path switching between paired P-to-P paths through the sequences illustrated in FIGS. 2 and 3.

Similarly, paired P-to-P paths 62 are set between the edge node A 100-1, which accommodates the site A 53-1, and an edge node C 100-3, which accommodates a site C 53-3. The representative path of the paired P-to-P paths 62 passes through the relay node 52-1 and a relay node 52-2. Paired P-to-P paths 63 are set between the edge node A 100-1, which accommodates the site A 53-1, and an edge node D 100-4, which accommodates a site D 53-4. The representative path of the paired P-to-P paths 63 passes through the relay node 52-1 and the relay node 52-2.

Figure 5:
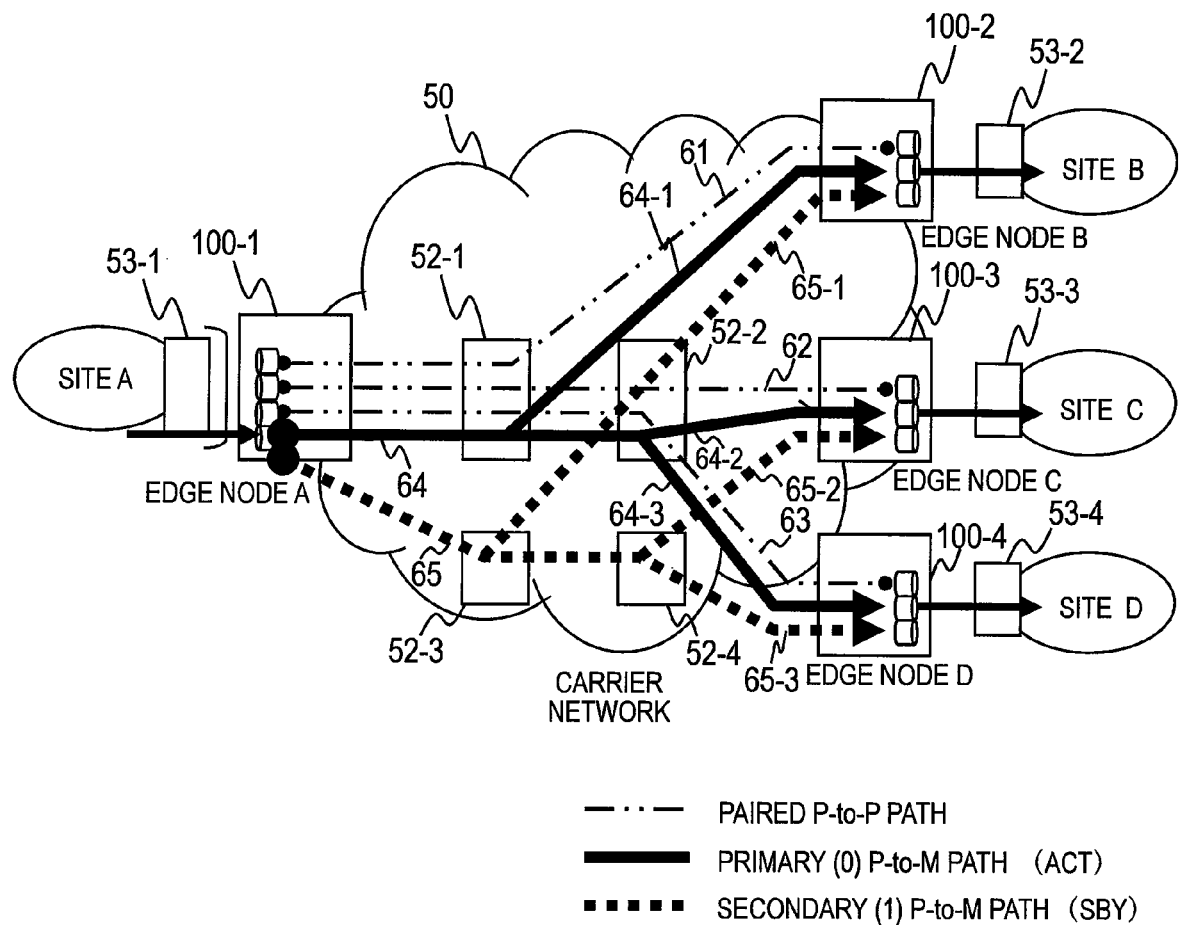
FIG. 5 is an explanatory diagram illustrating an example of P-to-P paths and P-to-M paths set in the carrier network according to the embodiment of this invention.

FIG. 5 is an explanatory diagram illustrating an example of P-to-P paths and P-to-M paths set in the carrier network 50 according to the embodiment of this invention.

Specifically, FIG. 5 illustrates an example in which the three pairs of P-to-P paths illustrated in FIG. 4, i.e., the paired P-to-P paths 61, 62, and 63, are set and duplicated P-to-M paths are also set. The duplicated P-to-M paths in this example have the edge node A 100-1 as the start node and the edge node B 100-2, the edge node C 100-3, and the edge node D 100-4 as end nodes. Those P-to-M paths are used as multicast communication paths that run from the start node to the multiple end nodes.

The P-to-M paths set in the example of FIG. 5 include a P-to-M path 64 and a P-to-M path 65 for duplication.

The P-to-M path 64 has the edge node A 100-1 as the start node, branches at the relay node 52-1 and the relay node 52-2, and has the edge node B 100-2, the edge node C 100-3, and the edge node D 100-4 as end nodes. In FIG. 5, branches of the P-to-M path 64 which lead to the edge node B 100-2, the edge node C 100-3, and the edge node D 100-4 are denoted by a P-to-M path 64-1, a P-to-M path 64-2, and a P-to-M path 64-3, respectively.

The P-to-M path 65 has the edge node A 100-1 as the start node, branches at a relay node 52-3 and a relay node 52-4, and has the edge node B 100-2, the edge node C 100-3, and the edge node D 100-4 as end nodes. In FIG. 5, branches of the P-to-M path 65 which lead to the edge node B 100-2, the edge node C 100-3, and the edge node D 100-4 are denoted by a P-to-M path 65-1, a P-to-M path 65-2, and a P-to-M path 65-3, respectively.

In this example, the P-to-M path 64 is set as a primary (0) path which is used as the ACT path, and the P-to-M path 65 is set as a secondary (1) path which is used as the SBY path.

P-to-M paths in general are used only for one-way communication. In the example of FIG. 5, the P-to-M path 64 and the P-to-M path 65 are used only for communication from the edge node A 100-1 to the edge node B 100-2, the edge node C 100-3, and the edge node D 100-4.

A relay node that is located at a branching point of a P-to-M path (in the example of FIG. 5, the relay nodes 52-1 to 52-4) copies a received frame and transmits the frame copy to the next relay node or edge node.

In the following description, the edge node A 100-1 to the edge node D 100-4 are also referred to as edge nodes 100. This means that a description of one edge node 100 is applicable to any of the edge node A 100-1 to the edge node D 100-4.

Setting two different P-to-M paths in the manner described above makes it possible to switch from the ACT P-to-M path to the other P-to-M path (in other words, to set the SBY P-to-M path as a new ACT path) in the event of a defect in the ACT P-to-M path. An example of a configuration of the edge node 100 that can switch logical paths in this manner is described with reference to FIGS. 6 to 14.

Figure 6:
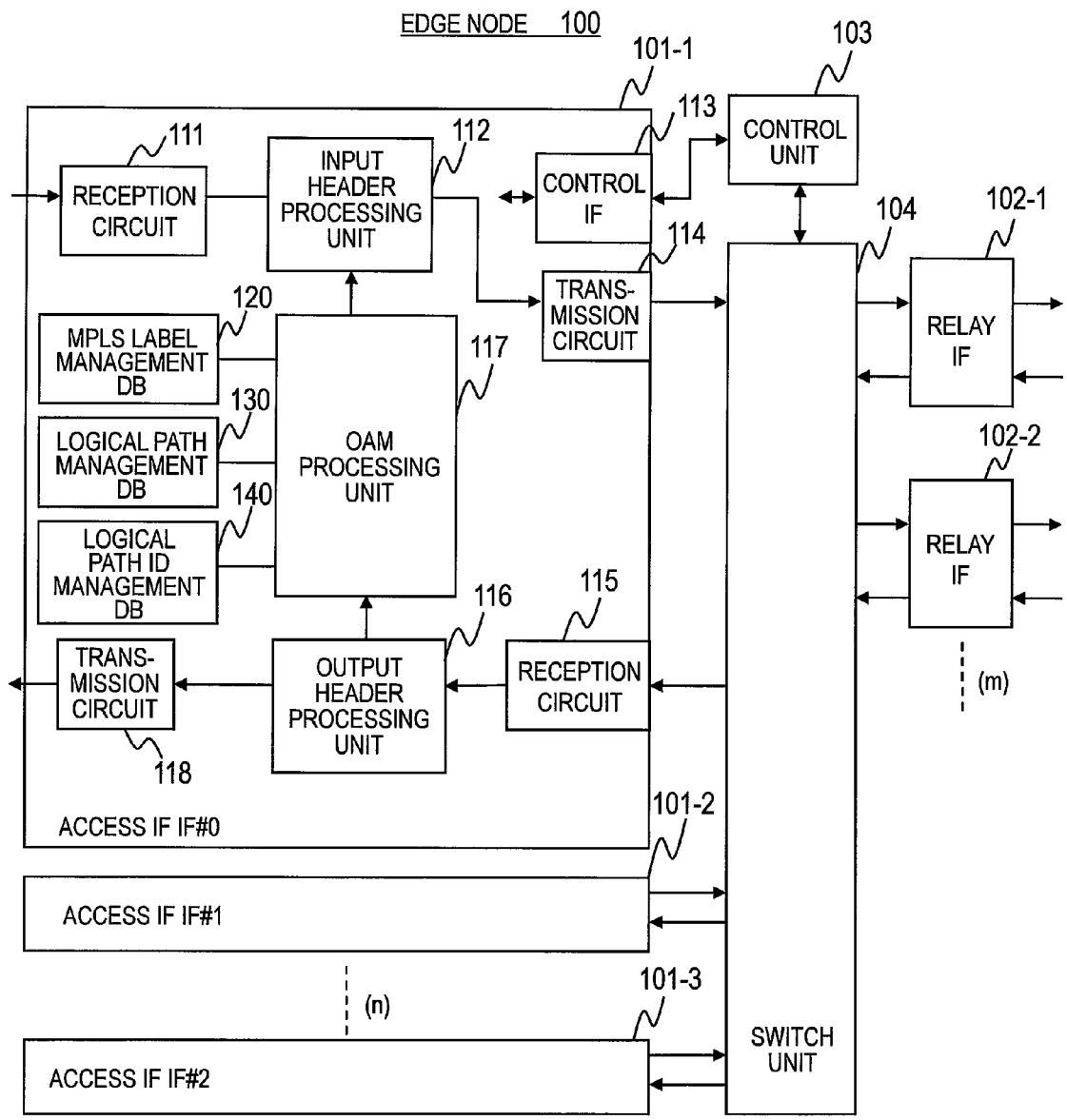
FIG. 6 is a block diagram illustrating an example of a configuration of an edge node according to the embodiment of this invention.

FIG. 6 is a block diagram illustrating an example of a configuration of the edge node 100 according to the embodiment of this invention.

The edge node 100 includes multiple access interfaces 101 (hereinafter referred to as access IFs 101), multiple relay interfaces 102 (hereinafter referred to as relay IFs 102), a switch unit 104, and a control unit 103.

Each access IF 101 accommodates a user site or the like. An access IF #0_101-1, an access IF #1_101-2, and an access IF #2_101-3 which are illustrated in FIG. 6 each constitute one of the multiple access IFs 101. The edge node 100 may have more access IFs 101.

Each relay IF 102 is connected to a relay node or another edge node 100. A relay IF 102-1 and a relay IF 102-2 which are illustrated in FIG. 6 each constitute one of the multiple relay IFs 102. The edge node 100 may have more relay IFs 102.

The switch unit 104 transfers a frame between interfaces.

The control unit 103 controls communication with the network management system 21, and also controls the operation of setting various parameters to the access IFs 101, the relay IFs 102, and the switch unit 104.

Each access IF 101 includes a reception circuit 111, an input header processing unit 112, a transmission circuit 114, a reception circuit 115, an output header processing unit 116, an OAM processing unit 117, and a transmission circuit 118.

The reception circuit 111 receives a frame from the user site.

The input header processing unit 112 analyzes the frame received from the user site, identifies a logical path of MPLS for each flow, and executes such processing as adding an MPLS label or transmitting an OAM frame.

In the case where a logical path has a duplicate, the input header processing unit 112 manages the primary (0) logical path and the secondary (1) logical path as duplicated routes. The input header processing unit 112 also has a function of attaching the MPLS label of a logical path that is currently used for communication (i.e., the ACT logical path) to a frame received from a user site upon reception of the frame. Information indicating whether the ACT logical path currently used for communication is a primary (0) path or a secondary (1) path is given for each logical path by the OAM processing unit 117, which performs APS processing.

The transmission circuit 114 transfers the frame received from the input header processing unit 112 to the switch unit 104.

The reception circuit 115 receives the frame from the switch unit 104.

The output header processing unit 116 analyzes a frame received from the carrier network. In the case where the received frame contains user data, the output header processing unit 116 deletes the MPLS label from the frame and then transfers the frame to the transmission circuit 118. In the case where the received frame is an OAM frame, the output header processing unit 116 transfers the frame to the OAM processing unit 117.

The transmission circuit 118 transfers the frame received from the output header processing unit 116 to the user site.

The OAM processing unit 117 executes OAM frame transmission/reception processing and APS processing. The OAM processing unit 117 holds an MPLS label management database (hereinafter referred to as DB) 120, a logical path management DB 130, and a logical path ID management DB 140 in order to manage duplication of a P-to-P path, duplication of a P-to-M path, and defect information.

Examples of the databases that the OAM processing unit 117 in the edge node 110 of FIG. 6 holds in order to duplicate a P-to-M path are described with reference to FIGS. 7 to 10.

FIG. 7 is an explanatory diagram illustrating an example of the logical path ID management DB 140 according to the embodiment of this invention.

The logical path ID management DB 140 contains information that associates an MPLS label value with a logical path ID, which is assigned to each logical path in order to manage logical paths within the edge node 100.

The logical path ID management DB 140 uses an MPLS label value 141 as a search key and holds a logical path type 142, a logical path ID 143, and a logical path status 144.

The logical path type 142 contains information indicating whether a logical path that is indicated by the MPLS label value 141 is a P-to-P path or a P-to-M path. The logical path ID 143 is identification information assigned to each logical path in order to manage logical paths within the edge node 100. The logical path status 144 contains information indicating whether a logical path that is indicated by the MPLS label value 141 is a primary (0) path or a secondary (1) path in the case where logical path duplication is employed.

In FIG. 7, "P-to-P", "20", and "0" are held as the logical path type 142, the logical path ID 143, and the logical path status 144, respectively, in association with a value "200" of the MPLS label value 141. This example shows that a logical path that is indicated by the MPLS label value "200" is identified by a logical path ID "20" within the edge node 100 and that this logical path is a primary (0) P-to-P path.

A primary (0) logical path and a secondary (1) logical path that constitute duplicated logical paths are identified by the same logical path ID within the edge node 100. For example, as illustrated in FIG. 7, a logical path that is indicated by the MPLS label value "200" is the primary (0) path of duplicated logical paths that are identified by the logical path ID "20", whereas a logical path that is indicated by an MPLS label value "300" is the secondary (1) path of the duplicated logical paths that are identified by the logical path ID "20".

The logical path management database 130 is made up of a P-to-P logical path management database 130-1, which is illustrated in FIG. 8, and a P-to-M logical path management database 130-2, which is illustrated in FIG. 9.

FIG. 8 is an explanatory diagram illustrating an example of the P-to-P logical path management database 130-1 according to the embodiment of this invention.

The P-to-P logical path management database 130-1 holds a P-to-P logical path ID 131 which is used as a search key, a P-to-P_ACT path 132, alert information 133, a P-to-M setting indicator 134, and a paired P-to-M logical path ID 135.

The P-to-P_ACT path 132 contains information for identifying which of the P-to-P paths that are identified by the logical path ID 131 is the current ACT path. The alert information 133 contains defect information of a P-to-P path identified by the logical path ID 131. The P-to-M setting indicator 134 contains information indicating whether or not a P-to-M path is set, which has a start node and end nodes matching those of a P-to-P path identified by the logical path ID 131. When the P-to-M setting indicator 134 has a value "enabled", the paired P-to-M logical path ID 135 contains the logical path ID of a P-to-M path that is associated with a P-to-P path identified by the logical path ID 131.

In this embodiment, a P-to-M path is associated with a P-to-P path having a start node as the start node of the P-to-M path and having an end node as one of multiple end nodes of the P-to-M path. In other words, when a P-to-P path and a P-to-M path are associated with each other, the start node of the P-to-P path and the start node of the P-to-M path match and the end node of the P-to-P path matches one of the end nodes of the P-to-M path.

In FIG. 8, "0", "no alert information", "enabled", and "40" are held as the P-to-P_ACT path 132, the alert information 133, the P-to-M setting indicator 134, and the paired P-to-M logical path ID 135, respectively, in association with a value "20" of the logical path ID 131. This example means that, of duplicated P-to-P paths that are identified by the logical path ID "20", the primary (0) path is currently set as the ACT path, that the primary (0) path is not experiencing a defect, and that the P-to-P path identified by the logical path ID "20" is associated with a P-to-M path identified by a logical path ID "40".

In this case, the start node of the P-to-P path identified by the logical path ID "20" matches the start node of the P-to-M path identified by the logical path ID "40", and the end node of the P-to-P path identified by the logical path ID "20" matches one of the end nodes of the P-to-M path identified by the logical path ID "40".

FIG. 9 is an explanatory diagram illustrating an example of the P-to-M logical path management database 130-2 according to the embodiment of this invention.

The P-to-M logical path management database 130-2 holds a P-to-M logical path ID 136 which is used as a search key, a P-to-M_ACT path 137, alert information 138, and a paired P-to-P logical path ID 139.

The P-to-M_ACT path 137 contains information for identifying which of P-to-M paths that are identified by the logical path ID 136 is the current ACT path. The alert information 138 contains defect information of a P-to-M path identified by the logical path ID 136. The paired P-to-P logical path ID 139 contains the logical path ID of a P-to-P path having a start node and an end node matching those of a P-to-M path identified by the logical path ID 136.

In FIG. 9, "0", "no alert information", and "20" are held as the P-to-M_ACT path 137, the alert information 138, and the paired P-to-P logical path ID 139, respectively, in association with a value "40" of the logical path ID 136. This example means that, of duplicated P-to-M paths that are identified by the logical path ID "40", the primary (0) path is currently set as the ACT path, that the primary (0) path is not experiencing a defect, and that the P-to-M path identified by the logical path ID "40" is associated with a P-to-P path identified by the logical path ID "20".

Specifically, the start node of the P-to-M path identified by the logical path ID "40" matches the start node of the P-to-P path identified by the logical path ID "20", and one of the end nodes of the P-to-M path identified by the logical path ID "40" matches the end node of the P-to-P path identified by the logical path ID "20".

The logical path management database 130 associates a P-to-P path and a P-to-M path with each other in the above-mentioned manner. A communication device of this embodiment holds information indicating the association relation between a P-to-M path and a P-to-P path as the one described above, which enables the communication device to identify a P-to-P path that can be used to notify the start node of a P-to-M path of a defect in the P-to-M path.

FIG. 10 is an explanatory diagram illustrating an example of the MPLS label management database 120 according to the embodiment of this invention.

The MPLS label management database 120 uses a logical path ID 121 as a search key and holds an ACT logical path 122, a primary (0) MPLS label value 123, and a secondary (1) MPLS label value 124.

The ACT logical path 122 contains information indicating which of logical paths that are identified by the logical path ID 121 is the ACT logical path. The primary (0) MPLS label value 123 is an MPLS label value that indicates the primary (0) path of logical paths identified by the logical path ID 121. The secondary (1) MPLS label value 124 is an MPLS label value that indicates the secondary (1) path of logical paths identified by the logical path ID 121.

In FIG. 10, "0", "200", and "300" are held as the ACT logical path 122, the primary (0) MPLS label value 123, and the secondary (1) MPLS label value 124, respectively, in association with a value "20" of the logical path ID 121. This example means that, of logical paths identified by the logical path ID "20", the primary (0) path is currently set as the ACT logical path and that MPLS label values indicating the primary (0) path and secondary (1) path of those logical paths are "200" and "300", respectively.

The example of FIG. 10 contains information for managing the MPLS labels of P-to-P paths and P-to-M paths both. Alternatively, a communication device of this embodiment may hold two types of MPLS label management database: an MPLS label management database for P-to-P paths and an MPLS label management database for P-to-M paths.

An example of "operation executed by the OAM processing unit 117 when a defect occurs in a P-to-P path" in FIG. 1 is now described. Specifically, the description takes as an example a case in which the defect illustrated in FIG. 2 occurs.

The edge node A 11-1 and the edge node B 11-2 regularly insert connectivity check frames to a logical path. To accomplish this, the OAM processing unit 117 regularly polls the MPLS label management database 120, thereby obtaining a primary (0) MPLS label value and a secondary (1) MPLS label value, and transmits connectivity check frames with the obtained MPLS label values attached thereto.

Whether or not a defect has occurred can also be checked by counting how many connectivity check frames have been received per unit time from the counter edge node (i.e., the edge node at the other end of communication) in the OAM processing unit 117.

For example, in the case where the edge node B 11-2 has received no connectivity check frame per unit time from its counter edge node, namely, the edge node A 11-1, via the logical path 14, the OAM processing unit 117 of the edge node B 11-2 determines that a defect has occurred in the logical path 14.

To give a concrete example, it may be determined that a defect has occurred in a logical path when a connectivity check frame is transmitted for every second and three consecutive connectivity check frames fail to be received. The above-mentioned unit time in this case is, for example, three seconds.

Determining that a defect has occurred in the logical path, the OAM processing unit 117 of the edge node B 11-2 looks up the P-to-P logical path management database 130-1 for a record that contains a logical path ID by which this logical path is identified, and then saves information indicating that a defect has been detected in the field of the alert information 133 in this record. The following description takes as an example a case in which a defect occurs in the primary (0) logical path. The information saved in the field of the alert information 133 in this case is "defect detected in primary (0) reception route".

In the case where logical path duplication is employed, the P-to-P logical path management database 130-1 may have two fields (for the primary (0) path and for the secondary (1) path) for the alert information 133 in association with a logical path ID by which a logical path determined as experiencing a defect is identified. Then, the information "defect detected in primary (0) reception route" is saved in those two fields of the alert information 133.

The OAM processing unit 117 of the edge node B 11-2 next searches the MPLS label management database 120 with the logical path ID of the logical path along which the defect has been detected as a key, to retrieve the ACT path 122, the primary (0) MPLS label value 123, and the secondary (1) MPLS label value 124 that are associated with this logical path ID. In this example where the defect is assumed to have occurred in the primary (0) path, the OAM processing unit 117 of the edge node B 11-2 creates a backward defect indicator to which the value retrieved as the primary (0) MPLS label value 123 is attached, and outputs this frame to the input header processing unit block. The OAM processing unit 117 of the edge node B 11-2 also creates a switch request frame to which the value retrieved as the secondary (1) MPLS label value 124 is attached (a frame for requesting that the secondary (1) path be set as a new ACT path), and outputs this frame to the input header processing unit block.

The backward defect indicator is received by the edge node A 11-1. The OAM processing unit 117 of the edge node A 11-1 uses the MPLS label value attached to the received frame as a search key to retrieve, from the logical path ID management database 140, the logical path type 142, the logical path ID 143, and the logical path status 144 that are associated with this MPLS label value.

Using the retrieved logical path ID 143 as a search key, the OAM processing unit 117 of the edge node A 11-1 searches one of the logical path management databases 130 that is specific to the type of the logical path where the defect has been detected. In this example where a defect is detected in a P-to-P path, the P-to-P logical path management database 130-1 of FIG. 8 is searched.

The OAM processing unit 117 of the edge node A 11-1 searches the P-to-P logical path management database 130-1 for a record that is associated with the retrieved logical path ID 143, and then stores information "defect detected in primary (0) transmission route" in the field of the alert information 133 of this record. The OAM processing unit 117 of the edge node A 11-1 can determine from which of the primary (0) path and the secondary (1) path the backward defect indicator has been received based on the value of the logical path status 144 retrieved from the logical path ID management database 140.

The switch request frame is also received by the edge node A 11-1. The OAM processing unit 117 of the edge node A 11-1 uses the same procedure as when the backward defect indicator is received to search the P-to-P logical path management database 130-1. The OAM processing unit 117 of the edge node A 11-1 rewrites the value of the P-to-P_ACT path 132 obtained by the search with a value that indicates a path used to receive the switch request frame.

The OAM processing unit 117 of the edge node A 11-1 next uses the retrieved logical path ID 143 as a search key to search the MPLS label management database 120. The OAM processing unit 117 of the edge node A 11-1 rewrites the value of the ACT path 122 retrieved from the MPLS label management database 120 with a value that indicates the path used to receive the switch request frame. The OAM processing unit 117 of the edge node A 11-1 also creates a switch response frame, attaches a label value that indicates the path used to receive the switch request frame to the switch response frame, and outputs the switch response frame to the input header processing unit 112. The OAM processing unit 117 of the edge node A 11-1 then notifies the input header processing unit 112 of the switch of the ACT path from one of the logical paths identified by the retrieved logical path ID 143 to the other (in this example, from the primary (0) path to the secondary (1) path).

The switch response frame is received by the edge node B 11-2. The OAM processing unit 117 of the edge node B 11-2 uses the MPLS label value attached to the received switch response frame as a search key to search the logical path ID management database 140, and retrieves the logical path type 142, the logical path ID 143, and the logical path status 144 that are associated with this MPLS label value.

Using the retrieved logical path ID 143 as a search key, the OAM processing unit 117 of the edge node B 11-2 searches one of the logical path management databases 130 that is relevant to the retrieved logical path type 142, and searches the MPLS label management database 120 as well. In the retrieved record entries, the OAM processing unit 117 of the edge node B 11-2 overwrites the ACT path fields (the field of the P-to-P_ACT path 132 or the P-to-M_ACT path 137, and the field of the ACT path 122) with a value that indicates a path used to receive the switch response frame. The OAM processing unit 117 of the edge node B 11-2 also notifies the input header processing unit 112 of the switch of the ACT path from one of the logical paths identified by the retrieved logical path ID 143 to the other (in this example, from the primary (0) path to the secondary (1) path).

Through the above operation, the ACT logical path in the example of FIG. 1 is switched from the logical path 14 to the logical path 15.

Described next with reference to FIGS. 11 to 18 is a procedure of notifying a defect and switching logical paths when a defect occurs in a primary (0) P-to-M path of FIG. 5.

Figure 11:
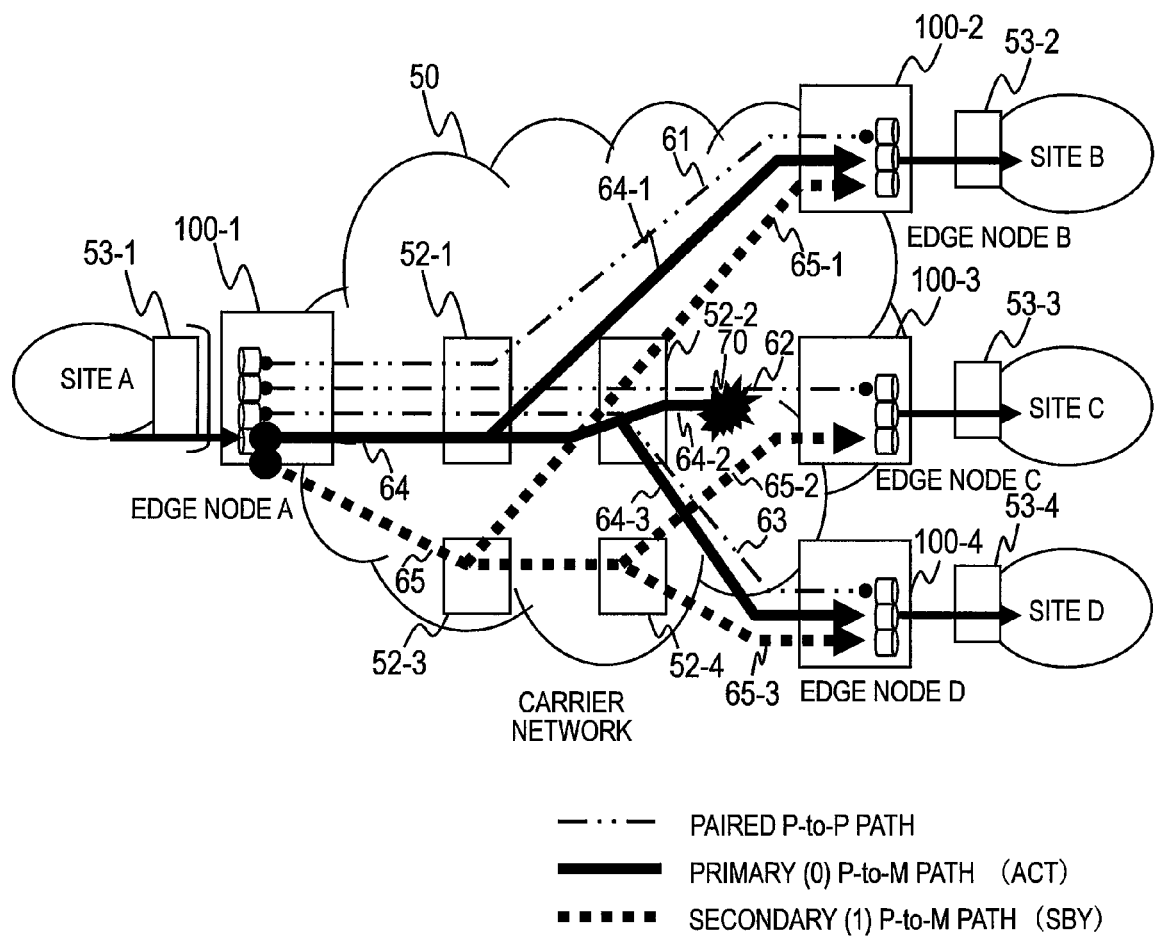
FIG. 11 is an explanatory diagram illustrating an example of a P-to-M path experiencing a defect in the embodiment of this invention.

FIG. 11 is an explanatory diagram illustrating an example of a P-to-M path experiencing a defect in the embodiment of this invention.

Specifically, FIG. 11 illustrates a case where a defect 70 occurs between the relay node 52-2 and the edge node C 100-3 along a section of the primary (0) P-to-M path 64, which is set to extend from the edge node A 100-1 to the edge node B 100-2, to the edge node C 100-3, and to the edge node 100-4. FIG. 11 is the same as FIG. 5 except for the defect 70.

Figure 12:
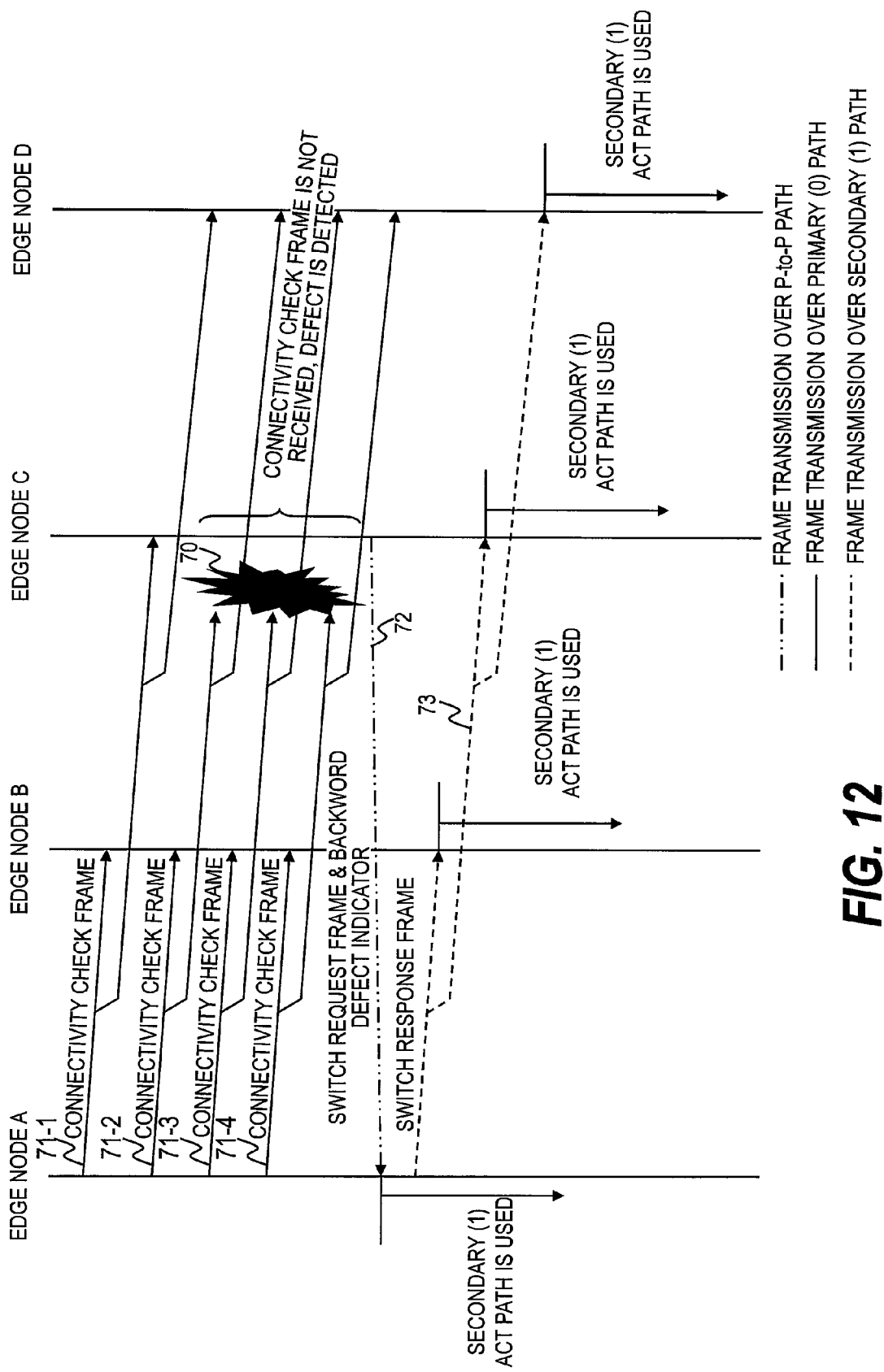
FIG. 12 is a sequence diagram illustrating an example of a procedure of switching P-to-M paths according to the embodiment of this invention.

FIG. 12 is a sequence diagram illustrating an example of a procedure of switching P-to-M paths according to the embodiment of this invention.

Specifically, FIG. 12 illustrates as an example a series of steps from defect detection to switching of P-to-M paths, which are executed when connectivity check frames are transmitted and received between the edge node A 100-1 and the edge node B 100-2, the edge node C 100-3, and the edge node D 100-4.

The site A 53-1 accommodated by the edge node A 100-1 regularly transmits connectivity check frames 71-1 to 71-4 over the P-to-M path. When the defect 70 occurs between the relay node 52-2 and the edge node C 100-3, the edge node 100-3 alone can no longer receive connectivity check frames 71 (the connectivity check frames 71-2 to 71-4 in the example of FIG. 12). The OAM processing unit 117 of the edge node C 100-3 thus detects that a defect has occurred in the logical path 64.

Information indicating that a defect has occurred is saved in the field of the alert information 138 of the P-to-M path management database 130-2.

Detecting the defect, the OAM processing unit 117 of the edge node C 100-3 transmits defect information and a logical path switch request to the start node (frame transmission 72 illustrated in FIG. 12). Specifically, the OAM processing unit 117 transmits a backward defect indicator and a switch request frame. This notification processing is described later with reference to FIG. 15.

The OAM processing unit 117 of the edge node A 100-1 receives the logical path switch request and executes switching of the ACT path. From then on, the OAM processing unit 117 of the edge node A 100-1 uses for communication a path that is turned into the ACT path as a result of the switch. The OAM processing unit 117 of the edge node A 100-1 then transmits a switch response frame 73. The switch response frame 73 is received by the edge node B 100-2, the edge node C 100-3, and the edge node D 100-4, which then execute switching of the ACT path. From then on, those edge nodes use for communication a path that is turned into the ACT path as a result of the switch. The switching processing and the responding processing are described later with reference to FIG. 16.

Figure 13:
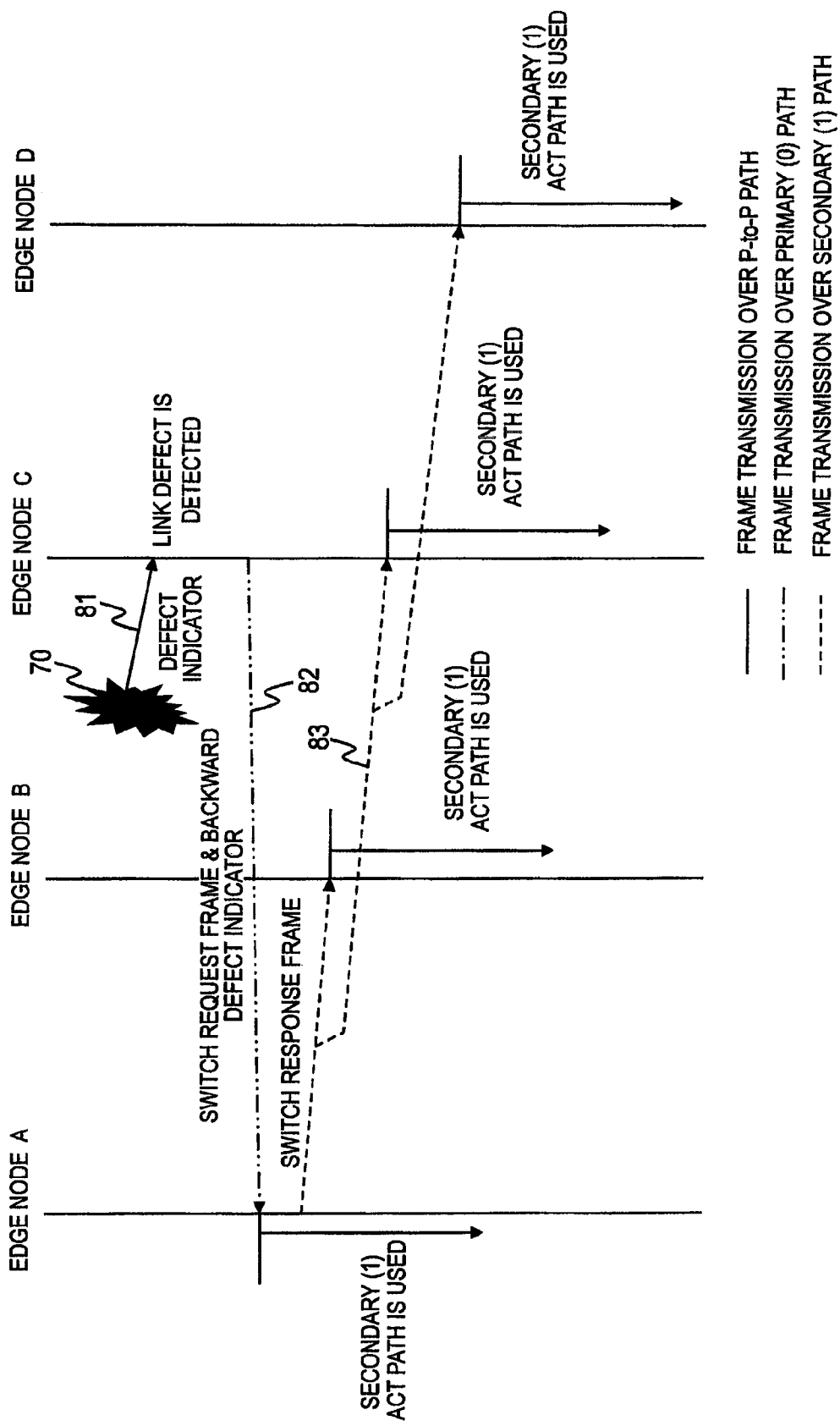
FIG. 13 is a sequence diagram illustrating another example of the procedure of switching P-to-M paths according to the embodiment of this invention.

FIG. 13 is a sequence diagram illustrating another example of the procedure of switching P-to-M paths according to the embodiment of this invention.

In the case where the relay nodes have a forward defect indication function, a defect is notified as illustrated in FIG. 13, in which a relay node (not shown) located between the relay node 52-2 and the edge node C 100-3 detects a defect and transmits a forward defect indicator 81 to the edge node C 100-3 alone. The OAM processing unit 117 of the edge node C 100-3 detects the occurrence of a defect by receiving the forward defect indicator 81.

Frame transmission 82 by the OAM processing unit 117 of the edge node C 100-3 which has received the forward defect indicator 81 is the same as the frame transmission 72 illustrated in FIG. 12. A switch response frame 83 which is transmitted from the edge node A 100-1 in response to the frame transmission 82 is the same as the switch response frame 73 illustrated in FIG. 12. Descriptions on the frame transmission 82 and the switch response frame 83 are therefore omitted herein.

Figure 14:
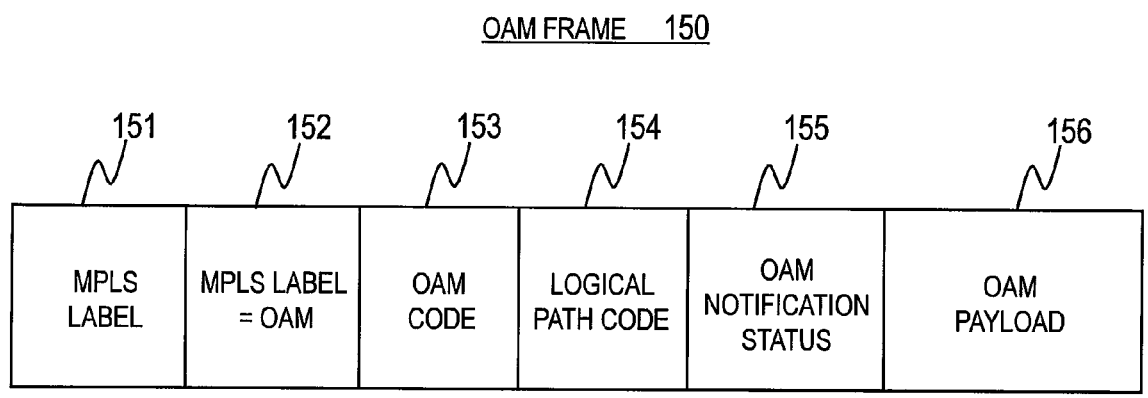
FIG. 14 is an explanatory diagram of a format of an OAM frame transmitted and received in the embodiment of this invention.

FIG. 14 is an explanatory diagram of the format of an OAM frame 150 transmitted and received in the embodiment of this invention.

The OAM frame 150 is transmitted and received in order to manage and maintain a network to which the MPLS protocol is applied. The connectivity check frames 71-1 to 71-4, the backward defect indicator, the forward defect indicator 81, the switch request frame, the switch response frames 73 and 83 which are transmitted and received in FIGS. 12 and 13 are each one type of the OAM frame 15 illustrated in FIG. 14.

A conventional OAM frame includes an MPLS label 151, an MPLS label 152, an OAM code 153, and an OAM payload 156.

The MPLS label 151 indicates a logical path to which the OAM frame belongs. Specifically, the value of the primary (0) MPLS label value 123 or the secondary (1) MPLS label value 124 retrieved from the MPLS label management database 120 by the OAM processing unit 117 of an edge node that transmits the OAM frame is set as the MPLS label 151. The OAM processing unit 117 of an edge node that receives the OAM frame uses the value of the MPLS label 151 in the received OAM frame as a key to search the logical path ID management database 140.

The MPLS label 152 indicates that the frame is an OAM frame.

The OAM code 153 identifies the type of the OAM frame. Specifically, the OAM code 153 identifies the OAM frame as a connectivity check frame, a backward defect indicator, a forward defect indicator, a switch request frame, a switch response frame, or other types of frame.

The OAM payload 156 contains detailed information that is notified by the OAM frame.

The OAM frame 150 of this embodiment has, in addition to the conventional information fields described above, a logical path code field 154 and an OAM notification status field 155, for an additional function of transmitting P-to-M path defect information and a path switch request via a P-to-P path.

The logical path code field 154 stores code information for identifying whether the OAM frame is for notifying information on a P-to-P path or for notifying information on a P-to-M path. Newly adding this field to the OAM frame format enables an edge node to determine whether the OAM frame 150 received over a P-to-P path is for notifying P-to-P path management information or for notifying P-to-M path management information.

The OAM notification status field 155 stores code information for identifying whether the OAM frame 150 that is for notifying P-to-M path management information conveys management information of the primary (0) P-to-M logical path or management information of the secondary (1) P-to-M logical path.

A common OAM frame is for notifying the counter node of information on a logical path over which the OAM frame is transmitted. However, adding the OAM notification status field 155 to the OAM frame 150 makes it possible to determine whether the OAM frame 150 of a P-to-M path transmitted over a P-to-P path conveys management information about the primary (0) logical path or management information about the secondary (1) logical path. An effect brought by this is that a P-to-P path can be used to notify the counter edge node of management information of a P-to-M path.

Figure 15:
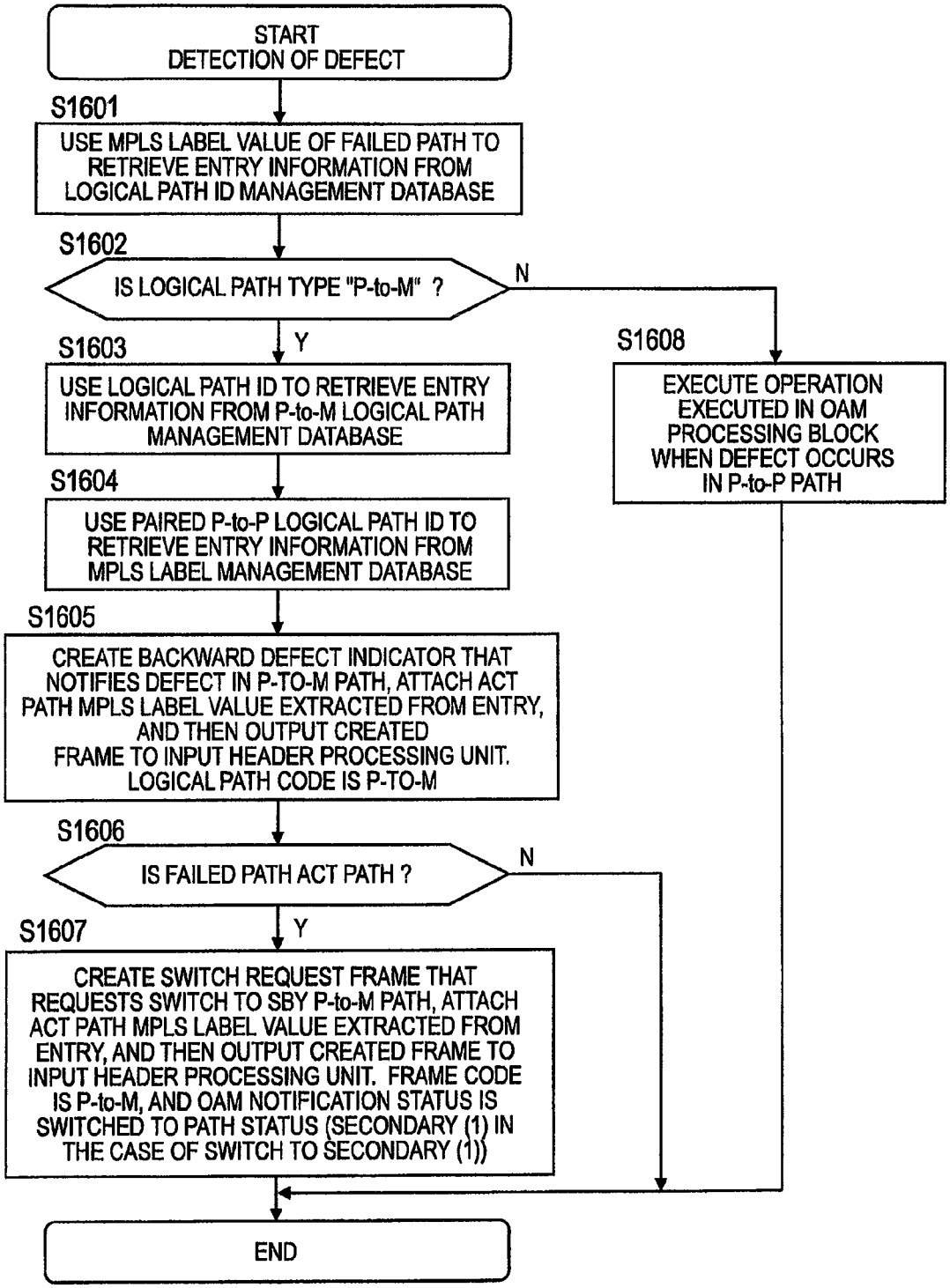
FIG. 15 is a flow chart illustrating processing that is executed when a defect is detected by an OAM processing unit according to the embodiment of this invention.

FIG. 15 is a flow chart illustrating processing that is executed when a defect is detected by the OAM processing unit 117 according to the embodiment of this invention.

For example, the OAM processing unit 117 of an edge node that has detected a defect by the procedure illustrated in FIG. 12 or 13 (the edge node C 100-3 in the examples of FIGS. 12 and 13) starts the processing of FIG. 15.

Upon detection of a defect, the OAM processing unit 117 searches the logical path ID management database 140 with the MPLS label value of a logical path where the defect is detected as a key, and retrieves entry information that is associated with this MPLS label value (S1601).

The OAM processing unit 117 next determines whether the failed logical path is a P-to-P path or a P-to-M path based on the logical path type 142 that is contained in the retrieved entry information (S1602). Specifically, the OAM processing unit 117 determines that the defect has occurred in a P-to-P path when the value of the logical path type 142 contained in the retrieved entry information is "P-to-P", and determines that the defect has occurred in a P-to-M path when the value of the contained logical path type 142 is "P-to-M".

When it is determined in Step S1602 that the failed logical path is a P-to-P path, the OAM processing unit 117 executes processing for the "operation executed by the OAM processing unit 117 when a defect occurs in a P-to-P path" which has been described with reference to FIGS. 1 and 2 (S1608). This processing is in conformity to International Telecommunication Union Telecommunication Standardization Sector (ITU-T) Recommendation Y.1731, and is the same as processing that is executed by the OAM processing unit 117 of prior art.

When it is determined in Step S1602 that the failed logical path is a P-to-M path, on the other hand, the OAM processing unit 117 uses the logical path ID 143 retrieved from the logical path ID management database 140 as a search key to search the P-to-M logical path management database 130-2, and retrieves entry information that is associated with this logical path ID (S1603).

The OAM processing unit 117 next uses the paired P-to-P logical path ID 139 that is contained in the entry information retrieved from the P-to-M logical path management database 130-2 as a search key to search the MPLS label management database 120, and retrieves entry information that is associated with the search key (S1604).

The OAM processing unit 117 then creates a backward defect indicator for notifying which path status of the P-to-M paths is experiencing the defect. The OAM processing unit 117 assigns an ACT path MPLS label value retrieved from the MPLS label management database 120 to the MPLS label 151 of the created backward defect indicator, and outputs the backward defect indicator to the input header processing unit 112 (S1605).

The ACT path MPLS label value is an MPLS label value that is associated with the value of the ACT path 122 in the entry information retrieved from the MPLS label management database 120 through the search in Step S1604. For example, the value of the primary (0) MPLS label value 123 is assigned as the ACT path MPLS label value when the value of the ACT path 122 is "0", and the value of the secondary (1) MPLS label value 124 is assigned as the ACT path MPLS label value when the value of the ACT path 122 is "1".

In the backward defect indicator to be output, the OAM processing unit 117 sets a code indicating a P-to-M path as the logical path code 154, and sets the status of the path (a value indicating the primary (0) path or the secondary (1) path) along which the defect has occurred as the OAM notification status 155.

The OAM processing unit 117 next determines whether or not the P-to-M path where the defect has been detected is the ACT path (S1606). When the logical path status 144 retrieved from the logical path ID management database 140 matches the P-to-M_ACT path 137 retrieved from the P-to-M logical path management database 130-2, it is determined that the defect has been detected in the ACT path.

When the path where the defect has been detected is the ACT path, user data cannot be communicated over the P-to-M path. The OAM processing unit 117 therefore creates a switch request frame that requests for a switch to the SBY P-to-M path, attaches the ACT path MPLS label value retrieved from the MPLS label management database 120 to the switch request frame, and then outputs the switch request frame to the input header processing unit 112 (S1607). This ACT path MPLS label value is the same as the value assigned in Step S1605.

In the switch request frame to be output, the OAM processing unit 117 sets a code indicating a P-to-M path as the logical path code 154, and sets a value indicating a path to be switched over to (the current SBY path to be newly set as the ACT path) as the OAM notification status 155.

On the other hand, when the path where the defect has been detected is the SBY path, this defect does not affect P-to-M path communication. The OAM processing unit 117 therefore ends the processing without outputting a switch request frame.

To give a concrete example, a case is described, in which MPLS label values associated with the primary (0) P-to-P path 62, the secondary (1) P-to-P path 62, the P-to-M path 64, and the P-to-M path 65 are "200", "300", "2000", and "3000", respectively, and the primary (0) P-to-P path 62 and the P-to-M path 64 are the ACT paths.

In this example, when a defect occurs in a section of the P-to-M path 64 that leads to the edge node C 100-3, namely, the P-to-M path 64-2, "P-to-M", "40", and "0" are retrieved as the logical path type 142, the logical path ID 143, and the logical path status 144 that are associated with the MPLS label value "2000" of the logical path where the defect is detected (S1601).

In this case, the logical path where the defect has occurred is determined as a P-to-M path (S1602), and "20" is retrieved as the paired P-to-P logical path ID 139 that is associated with the retrieved logical path ID "40" (S1603).

Next, a value "200" is retrieved as the primary (0) MPLS label value 123 that is associated with the logical path ID "20" and a value "0" of its associated ACT path 122 (S1604).

A backward defect indicator is then created with the retrieved MPLS label value "200" set as the MPLS label 151, and the created frame is transmitted to the input header processing unit 112 (S1605).

Because the path where the defect has been detected is the ACT path in this example (S1606), a switch request frame is also created with the retrieved MPLS label value "200" set as the MPLS label 151, and the created frame is transmitted to the input header processing unit 112 (S1607).

The frames transmitted in Steps S1605 and S1607 are transmitted to the primary (0) P-to-P path 62 which is associated with the MPLS label value "200". In those frames, a value indicating a P-to-M path and a value indicating the secondary (1) path are assigned as the logical path code 154 and the OAM notification status 155, respectively.

In this manner, upon detection of a defect in a P-to-M path, an end node of the P-to-M path obtains the logical path ID of paired P-to-P paths which is managed in the P-to-M logical path management database 130-2, and uses a P-to-P path identified by the logical path ID to transmit defect information and a switch request to the start node. The P-to-P path identified by the obtained logical path ID is one of multiple P-to-P paths associated with the P-to-M path where the defect has been detected, specifically, the one connected to the end node that has detected the defect.

The transmission of the backward defect indicator in Step S1605 and the transmission of the switch request frame in Step S1607 correspond to the backward defect indicator and switch request frame transmissions 72 and 82 which are illustrated in the sequence diagrams of FIGS. 12 and 13.

The backward defect indicator is transmitted prior to the switch request frame in the example of FIG. 15. However, whichever frame is transmitted first, the same effect is obtained.

Figure 16:
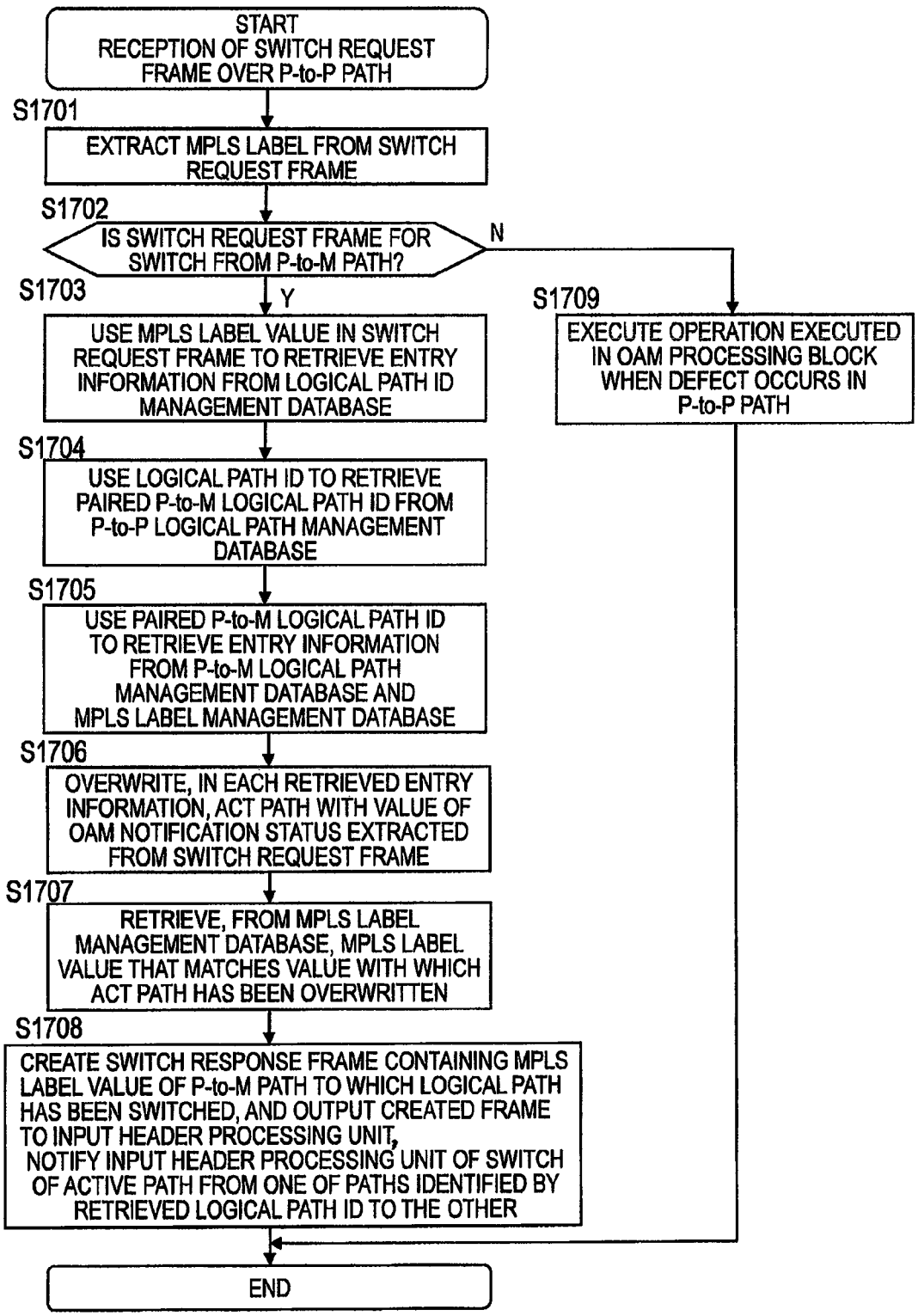
FIG. 16 is a flow chart illustrating processing that is executed when a switch request frame is received by the OAM processing unit according to the embodiment of this invention.

FIG. 16 is a flow chart illustrating processing that is executed when a switch request frame is received by the OAM processing unit 117 according to the embodiment of this invention.

Specifically, FIG. 16 illustrates processing that is executed by the OAM processing unit 117 of the edge node A 100-1 upon reception of a switch request frame requesting for a switch between P-to-M paths as in FIG. 12 or 13.

The OAM processing unit 117 of the edge node A 100-1 extracts the logical path code 154 from the received switch request frame (S1701).

The OAM processing unit 117 determines whether the extracted logical path code 154 indicates a P-to-P path or a P-to-M path (S1702).

When the logical path code 154 indicates a P-to-P path, the received switch request frame is a request for a switch of the ACT P-to-P path over which the switch request frame has been received. In this case, the OAM processing unit 117 executes processing for the above-mentioned "operation executed by the OAM processing unit 117 when a defect occurs in a P-to-P path" (S1709). This processing is in conformity to an ITU-T recommendation, and is the same as processing that is executed by the OAM processing unit 117 of prior art.

When the logical path code 154 indicates a P-to-M path, on the other hand, the received switch request frame is a request for a switch of the ACT P-to-M path that is associated with a P-to-P path over which the switch request frame has been received. In this case, the OAM processing unit 117 searches the logical path ID management database 140 with the value of the MPLS label 151 in the switch request frame as a search key, and retrieves entry information that is associated with the value of this MPLS label 151 (S1703).

The OAM processing unit 117 next uses the value of the logical path ID 143 that is contained in the entry information retrieved in Step S1703 as a search key to search the P-to-P logical path management database 130-1, and retrieves entry information that is associated with the value of this logical path ID 143 (S1704).

The OAM processing unit 117 next uses the value of the paired P-to-M logical path ID 135 that is contained in the entry information retrieved in Step S1704 as a search key to search the P-to-M logical path management database 130-2 and the MPLS label management database 120, and retrieves entry information that is associated with the value of this paired P-to-M logical path ID 135 (S1705).

The OAM processing unit 117 overwrites the P-to-M_ACT path 137 and the ACT path 122 that have been retrieved from the P-to-M logical path management database 130-2 and from the MPLS label management database 120, respectively, in Step S1705 with the value of the OAM notification status 155 extracted from the switch request frame (S1706).

From the MPLS label management database 120, the OAM processing unit 117 retrieves an MPLS label value that is associated with the new value of the ACT path 122 with which the field has been overwritten in Step S1706 (S1707). For example, when the value of the ACT path 122 is overwritten with "0", the value of the primary (0) MPLS label value 123 which is associated with the "0" value of the ACT path 122 is retrieved. When the value of the ACT path 122 is overwritten with "1", the value of the secondary (1) MPLS label value 124 which is associated with the "1" value of the ACT path 122 is retrieved. The thus retrieved MPLS label value indicates a P-to-M path that serves as the ACT path after the switch.

Next, the OAM processing unit 117 creates a switch response frame with the MPLS label value retrieved in Step S1707 set as the MPLS label 151, and outputs the created frame to the input header processing unit 112. The OAM processing unit 117 also notifies the input header processing unit 112 of the switch of the ACT path from one of the P-to-M paths identified by the paired P-to-M logical path ID 135 retrieved in Step S1704 to the other (S1708). Thereafter, the input header processing unit 112 assigns an MPLS label indicating a path that newly serves as the ACT path as a result of the switch to frames.

For example, in the case where the ACT P-to-M path is to be switched from the primary (0) path to the secondary (1) path, the start node transmits, before the switch is made, over the primary (0) path, other frames than OAM frames, which should be transmitted to multiple end nodes by multicast communication (specifically, frames that contain user data). After the switch is made, the start node transmits, over the secondary (1) path, other frames than OAM frames, which should be transmitted to multiple end nodes by multicast communication.

The start node of a P-to-M path can thus receive a request to switch a P-to-M path over a P-to-P path that is associated with the P-to-M path, which enables the start node to switch the ACT P-to-M path.

Though not illustrated in the flow chart of FIG. 16, upon reception of a backward defect indicator, the OAM processing unit 117 determines whether the backward defect indicator notifies a defect in a P-to-P path or in a P-to-M path based on the logical path code 154. In the case of a backward defect indicator that notifies a P-to-M path defect, the OAM processing unit 117 determines which of the primary (0) path and the secondary (1) path is experiencing the defect based on the OAM notification status 155. The OAM processing unit 117 then stores a value "defect in primary (0) transmission path" or a value "defect in secondary (1) transmission path" in the field of the alert information 138 in a record entry of the P-to-M logical path management database that is associated with the failed P-to-M path. This way, P-to-M path defect information can be managed in the start node of a P-to-M path as well.

The processing illustrated in FIG. 16 corresponds to processing steps from the backward defect indicator and switch request frame reception 72 or 82 to the transmission of the switch response frame 73 or 83 in the sequence diagrams of FIGS. 12 and 13. The switch response frame output in Step S1708 corresponds to the switch response frame 73 or 83.

Figure 17:
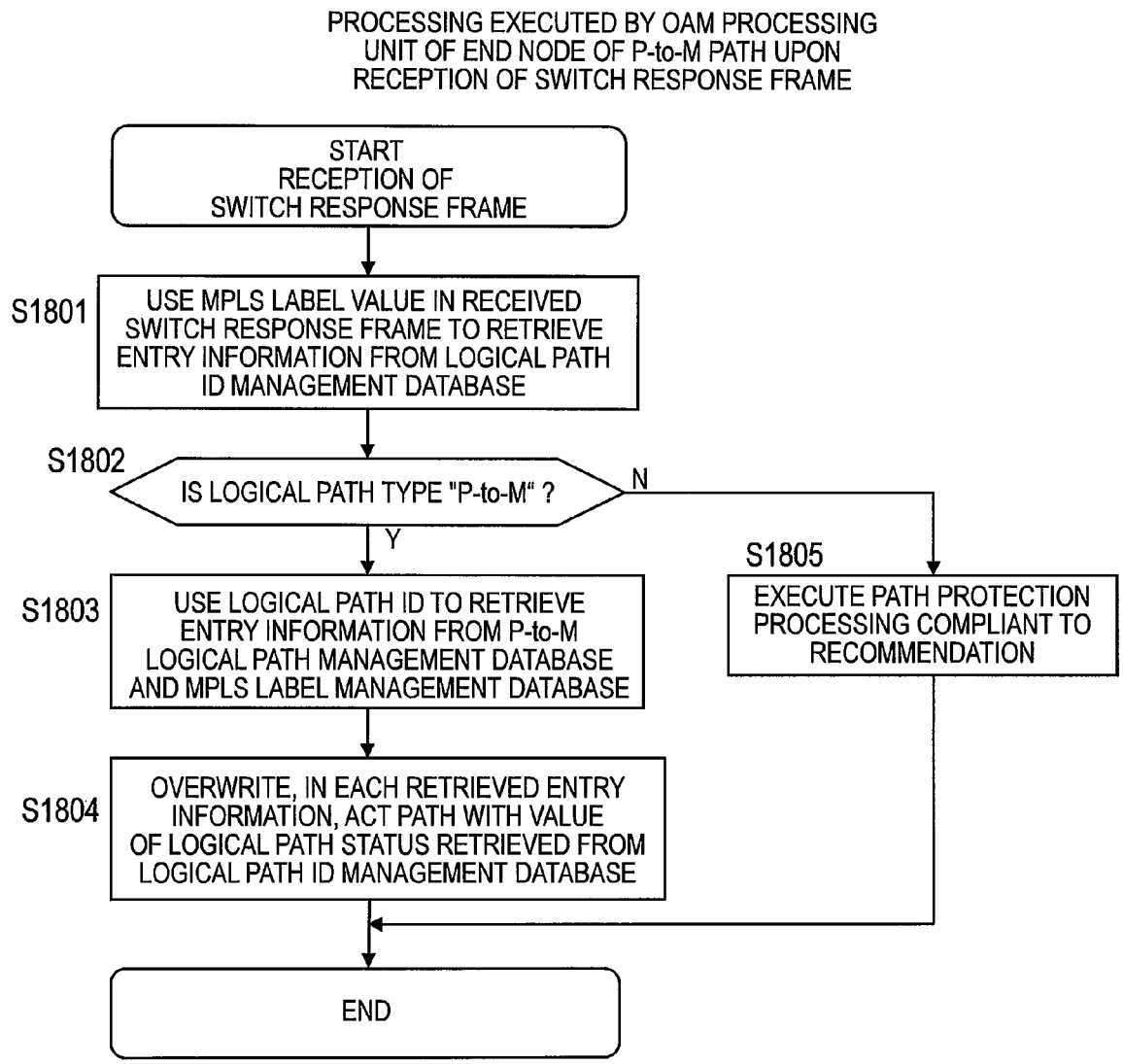
FIG. 17 is a flow chart illustrating processing that is executed when a switch response frame is received by the OAM processing unit according to the embodiment of this invention.

FIG. 17 is a flow chart illustrating processing that is executed when a switch response frame is received by the OAM processing unit 117 according to the embodiment of this invention.

Specifically, FIG. 17 illustrates processing that is executed by the OAM processing unit 117 of each end node (the edge node B 100-2, the edge node C 100-3, and the edge node D 100-4) that has received a switch response over a P-to-M path. Since a P-to-M path switch response is transmitted to the end nodes over a P-to-M path, the end nodes receive the switch response frame at once, and execute the processing illustrated in FIG. 17.

Receiving the switch response frame, the OAM processing unit 117 uses an MPLS label value extracted from the MPLS label 151 of the received switch response frame as a search key to search the logical path ID management database 140, and retrieves entry information that is associated with this MPLS label value (S1801).

The OAM processing unit 117 determines whether or not the logical path type 142 in the retrieved entry information indicates a P-to-M path (S1802).

When the logical path type 142 indicates a P-to-P path, it means that the ACT P-to-P path has been switched in the start node. In this case, the end node, too, needs to switch the ACT P-to-P path in the same manner. The OAM processing unit 117 therefore executes processing for the above-mentioned "operation executed by the OAM processing unit 117 when a defect occurs in a P-to-P path" (S1805). This processing is in conformity to an ITU-T recommendation, and is the same as processing that is executed by the OAM processing unit 117 of prior art.

When the logical path type 142 indicates a P-to-M path, on the other hand, it means that the ACT P-to-M path has been switched in the start node. In this case, the end node, too, needs to switch the ACT P-to-M path in the same manner. The OAM processing unit 117 therefore searches the P-to-M logical path management database 130-2 and the MPLS label management database 120 with the value of the logical path ID 143 that is contained in the retrieved entry information as a search key, and retrieves entry information that is associated with the value of this logical path ID 143 (S1803).

The OAM processing unit 117 overwrites the P-to-M_ACT path 137 and the ACT path 122 that are contained in the entry information retrieved from the P-to-M logical path management database 130-2 and the MPLS label management database 120 in Step S1803 with the value of the logical path status 144 retrieved from the logical path ID management database 140 (S1804). The OAM processing unit 117 also notifies the input header processing unit 122 of the switch of the ACT path from one of the P-to-M paths identified by this logical path ID to the other.

Each end node of a P-to-M path can thus receive a P-to-M path switch response over a P-to-M path, which enables the end node to switch the ACT P-to-M path in a manner that is consistent with the received switch response.

The processing illustrated in FIG. 17 corresponds to the reception of the switch response frame 73 or 83 and subsequent switching processing in the sequence diagrams of FIGS. 12 and 13.

For example, in the case where the ACT P-to-M path has been switched from the primary (0) path to the secondary (1) path, an end node that has received other frames than OAM frames (frames containing user data) over the secondary (1) path prior to the switch discards the received frames. An end node that receives other frames than OAM frames over the primary (0) after the switch discards the received frames.

Through the processing described above with reference to FIGS. 15 to 17, the ACT path can be switched between P-to-M paths that have the edge node A 100-1 as the start node and the edge node B 100-2, the edge node C 100-3, and the edge node D 100-4 as end nodes.

Figure 18:
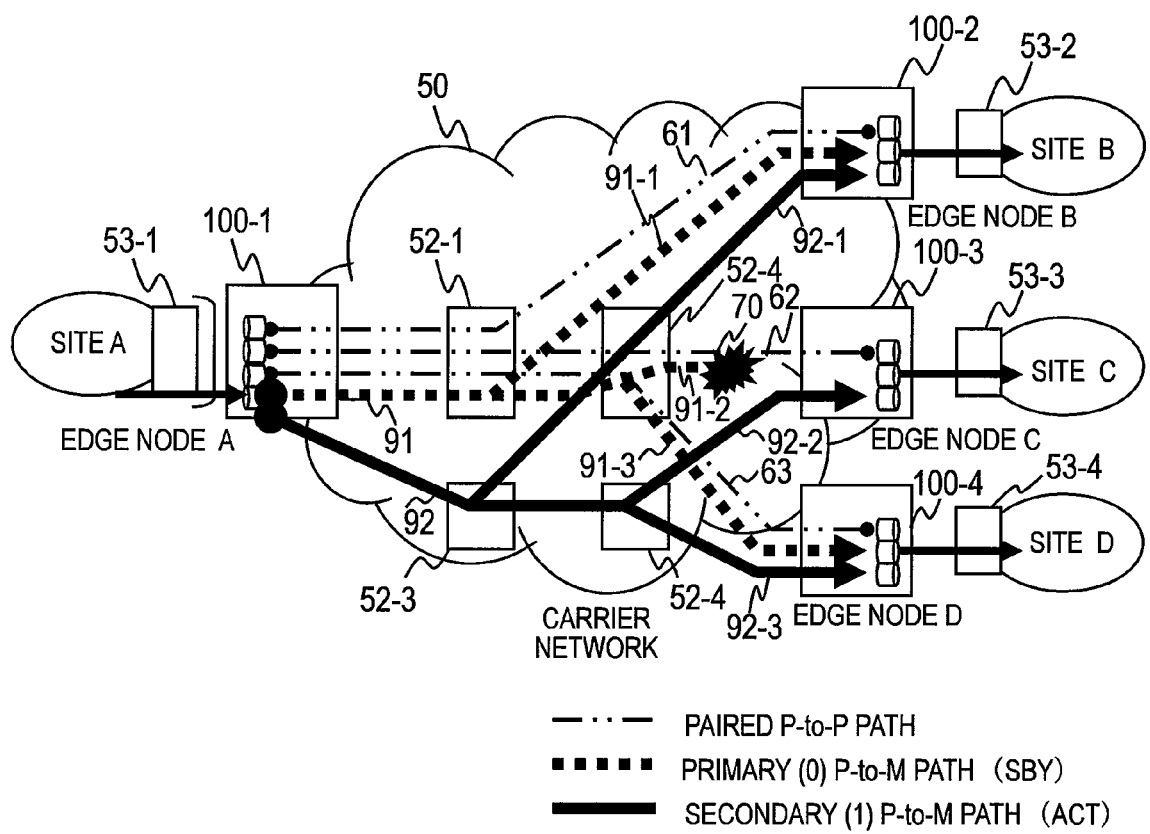
FIG. 18 is an explanatory diagram illustrating an example of P-to-M paths between which an ACT path has been switched according to the embodiment of this invention.

FIG. 18 is an explanatory diagram illustrating an example of P-to-M paths between which the ACT path has been switched according to the embodiment of this invention.

Specifically, FIG. 18 illustrates the result of switching the ACT path from one P-to-M path to the other after the defect 70 occurs as illustrated in FIG. 11. As illustrated in FIG. 18, a secondary (1) P-to-M path 92 (92-1 to 92-3) is the new ACT path whereas a primary (0) P-to-M path 91 (91-1 to 91-3) serves as the new SBY path. The secondary (1) P-to-M path 92 corresponds to the secondary (1) P-to-M path 65 of FIG. 11, and the primary (0) P-to-M 91 corresponds to the primary (0) P-to-M path 64 of FIG. 11. The secondary (1) P-to-M path

92 which is not experiencing a defect is used for data communication. The communication is thus continued after a defect occurs.

In the example of FIG. 4, paired P-to-P paths (duplicated P-to-P paths) are set between the edge node A 100-1 and the edge node B 100-2, the edge node C 100-3, and the edge node D 100-4. However, P-to-P path duplication is not necessary in accomplishing P-to-M path duplication by the same measures as those described above in the embodiment of this invention.

The network system of this embodiment has a function of switching back to a logical path when a defect is resolved in some form. Processing of switching back from the secondary (1) P-to-M path to the primary (0) P-to-M path after a defect in the P-to-M path is resolved is described with reference to a sequence diagram of FIG. 19 and a flow chart of FIG. 20.

Path switchback means processing in which, when a defect in one of the duplicated paths causes a switch of the ACT path from the normal path and the defect is subsequently resolved, the ACT path is switched back to the path that is now free of the defect.

Figure 19:
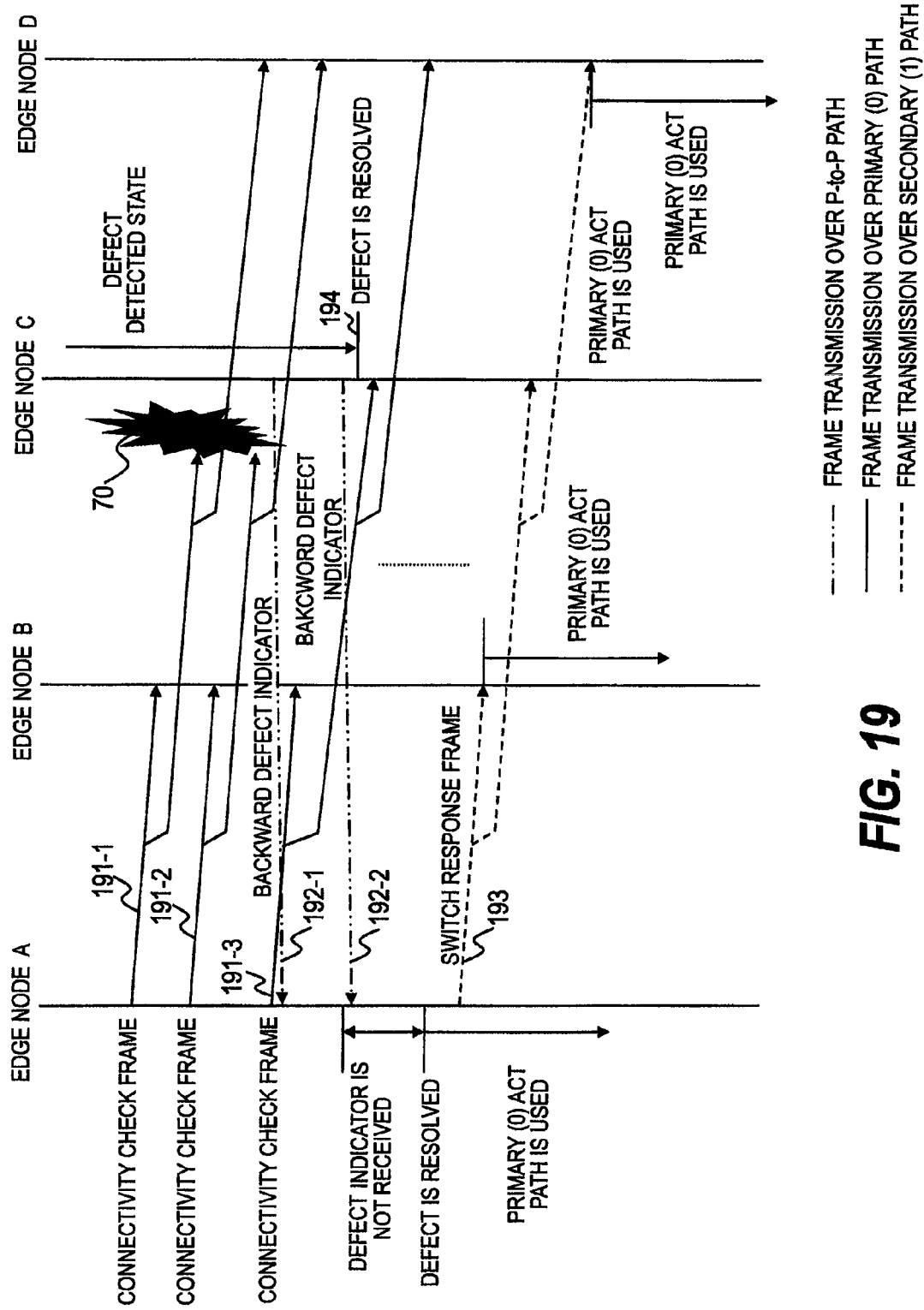
FIG. 19 is a sequence diagram illustrating path switchback processing which is executed when a defect is resolved in the embodiment of this invention.

FIG. 19 is a sequence diagram illustrating path switchback processing which is executed when a defect is resolved in the embodiment of this invention.

Specifically, FIG. 19 is a diagram illustrating the sequence of switchback executed when the defect 70 in the primary (0) path is resolved in the network system illustrated in FIG. 18. FIG. 19 illustrates an example of a case where edge nodes transmit connectivity check frames.

A connectivity check frame 191 (in FIG. 19, connectivity check frames 191-1 to 191-3) is regularly transmitted from the edge node A 100-1 to the edge node B 100-2, the edge node C 100-3, and the edge node D 100-4. The primary (0) path is in a "defect detected" state because the defect 70 prevents the edge node C 100-3 from receiving the connectivity check frames 191-1 and 191-2. The edge node C 100-3 periodically transmits a backward defect indicator 192 (backward defect indicators 192-1 and 192-2 in the example of FIG. 19) to the edge node A. The secondary (1) logical path is currently set as the ACT path used for the communication of user data.

When the defect 70 is resolved, the edge node C 100-3 can now receive the connectivity check frame 191-3. The edge node C 100-3 stops transmitting the backward defect indicators 192 because the defect is resolved ("defect state resolution 194").

Figure 20:
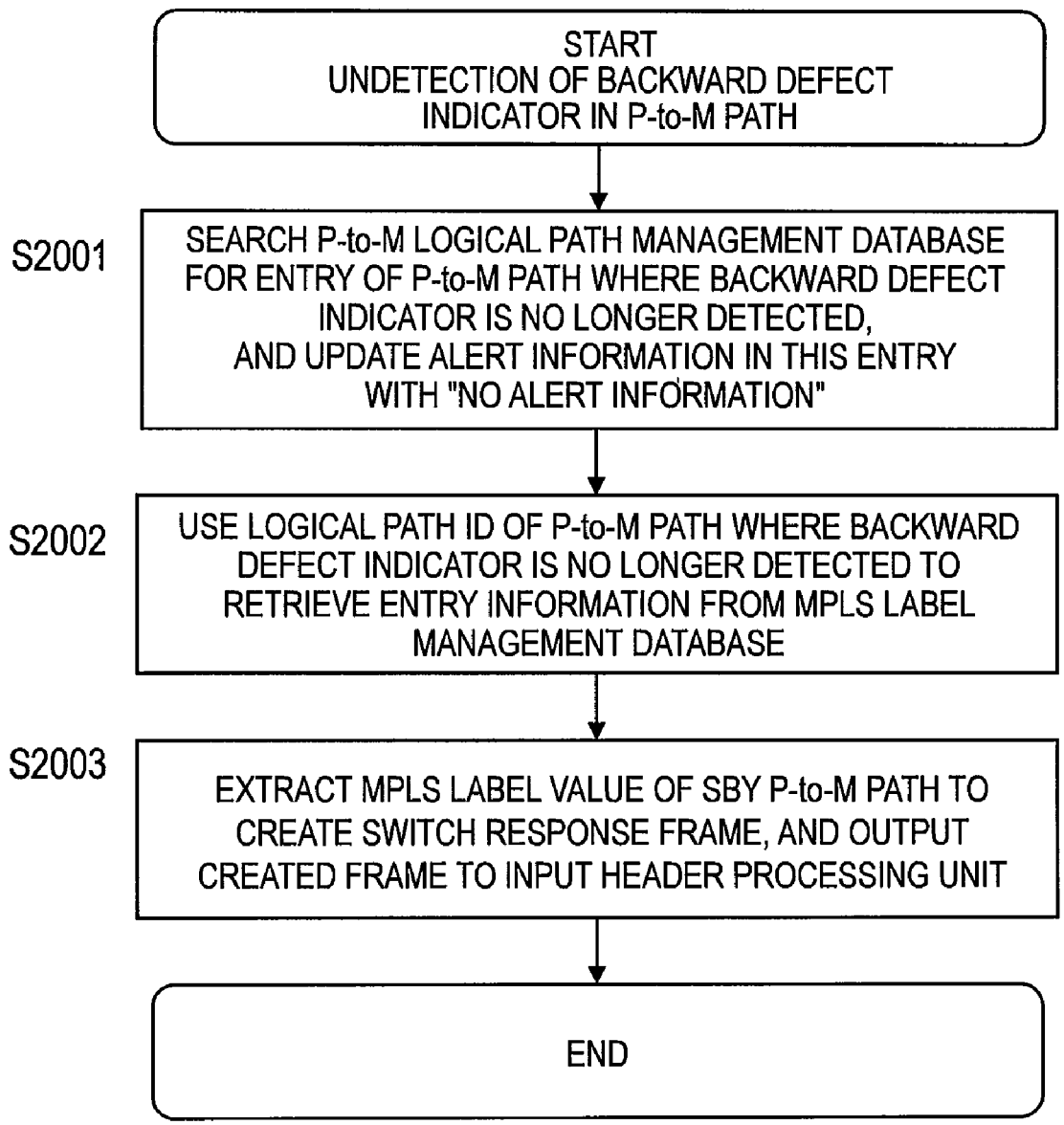
FIG. 20 is a flow chart illustrating path switchback processing which is executed when a defect is resolved in the embodiment of this invention.

When backward defect indicators are no longer received, the P-to-M path start node (the edge node A 100-1 in the example of FIG. 19) switches back the path following a sequence of FIG. 20. For example, when no backward defect indicator is received for a given period of time, the OAM processing unit 117 of the edge node A 100-1 may determine that the defect 70 has been resolved and execute path switchback.

FIG. 20 is a flow chart illustrating path switchback processing which is executed when a defect is resolved in the embodiment of this invention.

The OAM processing unit 117 of the edge node A 100-1, which is the start node of the P-to-M paths, looks up the P-to-M logical path management database 130-2 for a record entry of the P-to-M path about which backward defect indicators are no longer received, and updates the alert information 138 in this record entry with "no alert information" (S2001).

The OAM processing unit 117 next uses the P-to-M logical path ID 136 of the P-to-M path about which backward defect indicators are no longer received as a search key to search the MPLS label management database 120, and retrieves entry information that is associated with this P-to-M logical path ID 136 (S2002).

From the retrieved entry information, the OAM processing unit 117 extracts one of the primary (0) MPLS label value 123 and the secondary (1) MPLS label value 124, which is specified for the SBY path. Specifically, the secondary (1) MPLS label value 124 is extracted when the value of the ACT path 122 is "0", and the primary (0) MPLS label value 123 is extracted when the value of the ACT path 122 is "1". The OAM processing unit 117 then creates a switch response frame 193 and outputs the created frame to the input header processing unit 112 (S2003). The OAM processing unit 117 also notifies the input header processing unit 112 of the switch of the ACT path from one of the P-to-M paths identified by the logical path ID in question to the other.

The processing illustrated in FIG. 20 corresponds to a series of processing steps executed by the edge node A 100-1 in the sequence diagram of FIG. 19 from the cessation of the reception of defect indicators to the transmission of the switch response frame 193 following the resolution of the defect state.

In this way, the start node of the P-to-M paths can detect that a defect has been resolved in the failed P-to-M path and accordingly can execute path switchback.

The end nodes of the P-to-M paths receive the switch response frame 193 and execute the processing illustrated in FIG. 17 to switch back to the original path.

A network capable of switchback after the resolution of a defect in a P-to-M path is provided through the above processing.

While FIGS. 19 and 20 illustrate, as an example of switchback operation, processing for a network that uses connectivity check frames, similar switchback processing is employable in cases where a relay node transmits a forward defect indicator. In this case, the relay node periodically transmits a forward defect indicator to the relevant end node for the duration of a defect state. When the defect state is resolved, the relay node stops transmitting forward defect indicators. Detecting that forward defect indicators are no longer received, the end node determines that the defect in the logical path has been resolved and stops transmitting backward defect indicators. Subsequently, logical path switchback processing is executed through the procedure illustrated in FIG. 20.

Alternatively, path switchback may be executed such that the end node that has detected the resolution of the defect state transmits a switch request frame for requesting path switchback to the start node over a P-to-P path, and causes the start node to transmit a switch response frame over a P-to-M path. In this case, too, the switch request frame and the switch response frame are transmitted and received through the same procedure as the one illustrated in FIGS. 15 to 17.

For example, when the defect 70 causes a switch of the ACT path from the primary (0) path to the secondary (1) path and is subsequently resolved in FIG. 19, the edge node C 100-3 may transmit a switch request frame (not shown) that requests a switch of the ACT path from the secondary (1) path to the primary (0) path. The edge node A 100-1 in this case executes the logical path switchback processing of FIG. 20 based on the reception of the switch request frame, instead of the fact that the backward defect indicators 192 are no longer received.

A network capable of switchback after the resolution of a defect in a P-to-M path is provided through this processing, too.

While the present invention has been described in detail and pictorially in the accompanying drawings, the present invention is not limited to such detail but covers various obvious modifications and equivalent arrangements, which fall within the purview of the appended claims.

What is claimed is:

1. A network system comprising multiple communication devices,
the multiple communication devices comprising one start device, multiple end devices, and multiple relay devices for relaying data communication between the start device and the multiple end devices,
wherein a point-to-point logical path is set to be used for unicast communication between the start device and each of the multiple end devices,
wherein two point-to-multipoint logical paths are set to be used for multicast communication from the start node to the multiple end nodes,
wherein the two point-to-multipoint logical paths comprise a first point-to-multipoint logical path, which passes through at least one of the multiple relay nodes, and a second point-to-multipoint logical path, which passes through at least another one of the multiple relay nodes different from the at least one of the multiple relay nodes along the first point-to-multipoint logical path,
wherein the start device transmits, over the first point-to-multipoint logical path, data to be transmitted to the multiple end devices,
wherein, when one of the multiple end devices detects a defect on the first point-to-multipoint logical path, the one of the multiple end devices that has detected the defect transmits management information containing a logical path switch request over the point-to-point logical path set between the one of the multiple end devices and the start device,
wherein the start device receives the logical path switch request over the point-to-point logical path, and subsequently transmits, over the second point-to-multipoint logical path, the data to be transmitted to the multiple end devices,
wherein the start device and the multiple end devices hold association information that associates point-to-point paths, the first point-to-multipoint path, and the second point-to-multipoint path with one another,
wherein one of the end devices transmits management information containing a path switch request over a point-to-point path selected based on the association information, and
wherein the start device transmits data to be transmitted to the multiple end devices over the second point-to-multipoint path selected based on the association information.

2. The network system according to claim 1,
wherein, after receiving the logical path switch request, the start device transmits management information containing a logical path switch response over the second point-to-multipoint logical path, and
wherein the multiple end devices each receive the logical path switch response, and subsequently discard data received over the first point-to-multipoint logical path.

3. The network system according to claim 1,
wherein the start device transmits, on a given schedule, over the first point-to-multipoint logical path, management information containing information for checking logical path connectivity, and
wherein, when one of the multiple end devices fails to receive, on the given schedule, over the first point-to-multipoint logical path, the management information containing the information for checking the logical path connectivity, the one of the multiple end devices detects that a defect has occurred on the first point-to-multipoint logical path.

4. The network system according to claim 1,
wherein, when a defect occurs in one of the multiple relay devices through which the first point-to-multipoint logical path passes, the one of the multiple relay devices transmits management information containing a notification of the defect over the first point-to-multipoint logical path, and
wherein, when one of the multiple end devices receives the management information containing the notification of the defect from the one of the multiple relay devices, the one of the multiple end devices detects that a defect has occurred on the first point-to-multipoint logical path.

5. The network system according to claim 1,
wherein the start device is configured to:
after determining that the defect on the first point-to-multipoint logical path has been resolved, transmit, over the first point-to-multipoint logical path, the data to be transmitted to the multiple end devices; and
after determining that the defect on the first point-to-multipoint logical path has been resolved, transmit management information containing a logical path switch response over the first point-to-multipoint logical path, and
wherein the multiple end devices each receive the logical path switch response, and subsequently discard data received over the second point-to-multipoint logical path.

6. The network system according to claim 5,
wherein, after the one of the multiple end devices detects the defect on the first point-to-multipoint logical path, the one of the multiple end devices that has detected the defect transmits management information containing a notification of the defect on a given schedule over the point-to-point logical path set between the one of the multiple end devices and the start device, until the detected defect is resolved, and
wherein, when the start device no longer receives the management information containing the notification of the defect on the given schedule after receiving the management information containing the notification of the defect at least once, the start device determines that the defect on the first point-to-multipoint logical path has been resolved.

7. The network system according to claim 6, wherein the notification of the defect contains information indicating that a defect has occurred on the first point-to-multipoint logical path.

8. The network system according to claim 6,
wherein the start device transmits, on a given schedule, over the first point-to-multipoint logical path, management information containing information for checking logical path connectivity,
wherein, when one of the multiple end devices fails to receive, on the given schedule, over the first point-to-multipoint logical path, the management information containing the information for checking the logical path connectivity, the one of the multiple end devices detects that a defect has occurred on the first point-to-multipoint logical path, and
wherein, when the one of the multiple end devices receives over the first point-to-multipoint logical path the management information containing the information for checking the logical path connectivity after the defect is detected, the one of the multiple end devices determines that the detected defect has been resolved.

9. The network system according to claim 1,
wherein, when the defect detected on the first point-to-multipoint logical path is resolved, the one of the multiple end devices that has detected the resolution of the defect transmits management information containing a second logical path switch request over the point-to-point logical path set between the one of the multiple end devices and the start device,
wherein the start device is configured to:
receive the second logical path switch request over the point-to-point logical path, and subsequently transmit, over the first point-to-multipoint logical path, the data to be transmitted to the multiple end nodes; and
after receiving the second logical path switch request over the point-to-point logical path, transmit management information containing a logical path switch response over the first point-to-multipoint logical path, and
wherein the multiple end devices each receive the logical path switch response, and subsequently discard data received over the second point-to-multipoint logical path.

10. A communication device included in a network system, in which a point-to-point logical path is set to be used for unicast communication between the communication device and a first other communication device, and two point-to-multipoint logical paths are set to be used for multicast communication from the first other communication device to the communication device and at least one second other communication device, the communication device comprising:
at least one user interface coupled to a user site;
at least one relay interface coupled to another communication device; and
a switch for controlling data transfer between the at least one user interface and the at least one relay interface,
wherein the two point-to-multipoint logical paths comprise a first point-to-multipoint logical path, which passes through at least one third other communication device, and a second point-to-multipoint logical path, which passes through at least one fourth other communication device, and
wherein the communication device is configured to:
hold information that associates the point-to-point logical path, the first point-to-multipoint logical path, and the second point-to-multipoint logical path with one another; and
transmit, when detecting a defect on the first point-to-multipoint logical path, management information containing a logical path switch request over the point-to-point logical path that is associated with the first point-to-multipoint logical path.

11. The communication device according to claim 10, which, when management information containing a switch response that indicates a switch between logical paths is received over the second point-to-multipoint logical path and then data other than not the management information is received over the first point-to-multipoint logical path, discards the received data.

12. The communication device according to claim 10, which, when failing to receive, on a given schedule, over the first point-to-multipoint logical path, management information containing information for checking logical path connectivity, detects that a defect has occurred on the first point-to-multipoint logical path.

13. The communication device according to claim 10, which, when management information containing a notification of a defect is received from the at least one third other communication device, detects that a defect has occurred on the first point-to-multipoint logical path.

14. The communication device according to claim 10, which, after detecting a defect on the first point-to-multipoint logical path, transmits management information containing a notification of the defect on a given schedule over the point-to-point logical path that is associated with the first point-to-multipoint logical path, until the detected defect is resolved.

15. The communication device according to claim 10, which is configured to:
when failing to receive, on a given schedule, over the first point-to-multipoint logical path, management information containing information for checking logical path connectivity, detect that a defect has occurred on the first point-to-multipoint logical path; and
when the defect is detected and then the management information containing the information for checking the logical path connectivity is received over the first point-to-multipoint logical path, determine that the detected defect has been resolved.

16. A communication device included in a network system, in which two point-to-multipoint logical paths are set to be used for multicast communication from the communication device to multiple first other communication devices, and a point-to-point logical path is set to be used for unicast communication between the communication device and each of the multiple first other communication devices, the communication device comprising:
at least one user interface coupled to a user site;
at least one relay interface coupled to another communication device; and
a switch for controlling data transfer between the at least one user interface and the at least one relay interface,
wherein the two point-to-multipoint logical paths comprise a first point-to-multipoint logical path, which passes through at least one second other communication device, and a second point-to-multipoint logical path, which passes through at least one third other communication device, and
wherein the communication device is configured to:
hold information that associates the point-to-point logical path, the first point-to-multipoint logical path, and the second point-to-multipoint logical path with one another;
transmit, over the first point-to-multipoint logical path, data to be transmitted to the multiple first other communication devices; and
after receiving a logical path switch request over the point-to-point logical path that is associated with the first point-to-multipoint logical path, transmit, over the second point-to-multipoint logical path that is associated with the point-to-point logical path, the data to be transmitted to the multiple first other communication devices.

17. The communication device according to claim 16, which transmits, on a given schedule, over the first point-to-multipoint logical path, management information containing information for checking logical path connectivity.

18. The communication device according to claim 16, which, after determining that a defect on the first point-to-multipoint logical path has been resolved, transmits, over the first point-to-multipoint logical path, the data to be transmitted to the multiple first other communication devices.

19. The communication device according to claim 16, which, when the communication device no longer receives a notification of a defect on a given schedule over the point-to-point logical path that is associated with the first point-to-multipoint logical path after receiving the notification of the defect at least once, determines that the defect on the first point-to-multipoint logical path has been resolved.

* * * * *